United States Patent [19]

Kubo et al.

[11] Patent Number: 5,123,161
[45] Date of Patent: Jun. 23, 1992

[54] APPARATUS FOR SETTING CAR BODY COMPONENTS IN MOTORCAR BODY ASSEMBLING LINE

[75] Inventors: Takashi Kubo; Shigeru Okazaki; Tetsuro Yamanobe; Ken Kushizaki, all of Sayama, Japan

[73] Assignee: Honda Giken Kogyo Kabushiki Kaisha, Tokyo, Japan

[21] Appl. No.: 556,700

[22] Filed: Jul. 11, 1990

[30] Foreign Application Priority Data

| | | | |
|---|---|---|---|
| Jul. 12, 1989 | [JP] | Japan | 1-81140[U] |
| Jul. 12, 1989 | [JP] | Japan | 1-81141[U] |
| Jul. 12, 1989 | [JP] | Japan | 1-81142[U] |
| Jul. 13, 1989 | [JP] | Japan | 1-179164 |

[51] Int. Cl.$^5$ .............................................. B23P 21/00
[52] U.S. Cl. ........................................ 29/784; 219/79; 219/80; 219/86.24; 228/47; 29/799; 29/822; 29/33 K
[58] Field of Search ................. 29/771, 783, 784, 791, 29/795, 799, 822, 823, 824, 33 K, 33 P, 564; 228/4.1, 6.1, 47, 49.1; 219/79, 80, 86.24, 86.7, 158, 161

[56] References Cited

U.S. PATENT DOCUMENTS

| | | | |
|---|---|---|---|
| 4,538,044 | 8/1985 | Kadowaki et al. | 219/80 |
| 4,589,199 | 5/1986 | Ohtaki et al. | 29/791 |
| 4,767,046 | 8/1988 | Kumagai et al. | 29/822 |

Primary Examiner—P. W. Echols
Assistant Examiner—David P. Bryant
Attorney, Agent, or Firm—Armstrong, Nikaido, Marmelstein, Kubovcik & Murray

[57] ABSTRACT

An apparatus for use in a motorcar body assembling line for setting car body components including a floor panel, a roof panel, and side panels on a set carrier in a predetermined positional relationship in a setting station at a starting end of the assembling line. The apparatus has a floor panel setting device for transporting a floor panel to, and setting it on, the set carrier; a pair of right and left side-panel setting devices for receiving a pair of right and left side panels which are transported to an upper position of the setting station by a hanger and for setting them on the set carrier; and a roof panel setting device for setting a roof panel between roof side rails of the right and left side panels which have been set on the set carrier. Each of the side panel setting devices includes a vertically moveable lifting frame, a device for vertically moving the lifting frame, a jig for positioning and holding the side panel, the jig being provided on the lifting frame so as to be advanced and retracted in a lateral direction such that the side panel is received from the hanger by lateral advancement and retraction of the jig at a lifted position of each of the lifting frames and that the side panel is set on the set carrier by lateral advancement and retraction of the jig at a lowered position of each of the lifting frames, and a device for advancing and retracting the jig in the lateral direction.

6 Claims, 22 Drawing Sheets

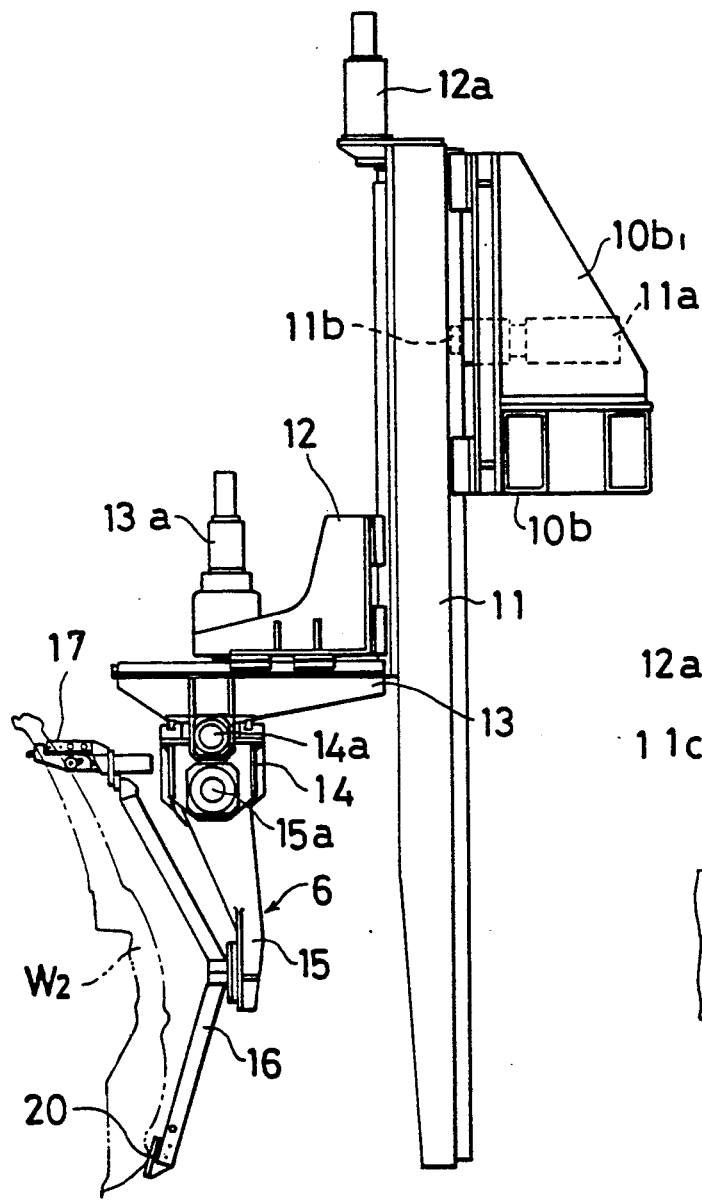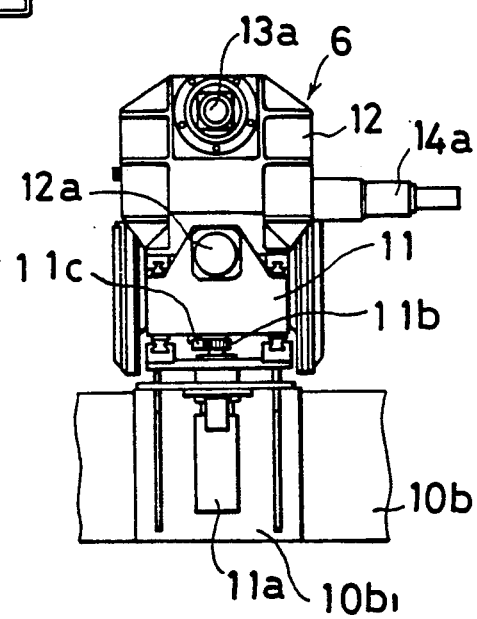

APPARATUS FOR SETTING CAR BODY COMPONENTS IN MOTORCAR BODY ASSEMBLING LINE

BACKGROUND OF THE INVENTION

This invention relates to an apparatus for setting and positioning car body components on a set carrier in which motorcar body components such as a floor panel, a roof panel, side panels and the like are set into position on the set carrier in a predetermined positional relationship in a setting station at a starting end of a car body assembling line.

A motorcar body assembling line is shown in Japanese Published Unexamined Patent Application No. 114173/1984 (U.S. Pat. No. 4,538,044, which is incorporated herein by reference in its entirety). In this assembling line, a set carrier is reciprocated between a setting station and a welding (assembling) station. Car body components such as a floor panel, a roof panel and side panels are set into position on the set carrier by separate setting devices respectively for the floor panel, the roof panel and the side panels (hereinafter referred to as "floor panel setting device", etc.) in a predetermined positional relationship. These car body components are conveyed by the set carrier to the welding station while they are maintained in the set condition and are welded together for assembly into a car body framework by welding jigs which are placed on both sides of the welding station. Thereafter, the assembled body travels down the assembling line for the addition of further components and other treatments.

In this assembling line, the side panel setting device is composed of: a pair of right and left drop lifters which receive a pair of right and left side panels conveyed by a hanger to an upper position of the setting station, and then lower them; and a pair of right and left setting jigs which receive the respective side panels from the drop lifters for setting them onto the set carrier. The roof panel setting device is supported by a guide frame which is provided on one side of the setting station, such that a laterally elongate movable frame which is provided at one end thereof with a setting jig for the roof panel is movable in a lateral direction facing the setting station. After the set carrier has been returned to the setting station, the floor panel is set on the set carrier by the floor panel setting device. Then, each of the side panels which have been received by the respective setting jig from the respective drop lifter, is set on the set carrier by the respective setting jig such that the lower edge of the side panel is connected to the side edge of the floor panel. At the same time, the jig of the roof panel setting device is advanced into the setting station by the movement of the movable frame so that the roof panel which has been held in advance at the side of the setting station may be set between the roof side rails of the right and left side panels.

In this assembling line, the setting jig for the roof panel, i.e., the movable frame for mounting the setting jig in a suspended manner, must be moved laterally at a level higher than the side panel setting jigs in order to prevent the roof panel setting jig from interfering with those side panel setting jigs which are disposed at one side of the setting station. Therefore, the guide frame is composed of a laterally elongate gantry frame such that the movable frame may be supported on an upper beam portion thereof. Further, in order to increase the supporting rigidity of the movable frame for supporting the setting jig (which is a heavy item) at one end in a cantilevered manner, it is necessary to maintain a long supporting span on the other side of the movable frame relative to the beam portion. Consequently, the entire roof panel setting device, inclusive of the guide frame, becomes large, and it is necessary to maintain a large space for disposing the roof panel setting device at the side of the setting station, resulting in a poor space efficiency.

In addition, in this assembling line, a dash board upper piece and a rear tray piece which are to be mounted between the right and left side panels, are manually placed in position in the setting station. This manual work has been a problem in improving the productivity.

OBJECTS AND SUMMARY OF THE INVENTION

Taking the above problems into account, this invention has a first object of narrowing the side space of the setting station to improve the space efficiency and a second object of automatically setting the dash board upper piece and the rear tray piece, as well.

In order to attain the above-mentioned first object, this invention is a setting apparatus for setting motorcar body components such as a floor panel, a roof panel, side panels, and the like in a car body assembling line in which the car body components are set on a set carrier in a predetermined positional relationship in a setting station at a starting end of the assembling line. The setting apparatus includes:

a floor panel setting device for transporting a floor panel to, and setting it on, the set carrier;

a pair of right and left side-panel setting devices for receiving a pair of right and left side panels which are transported to an upper position of the setting station by a hanger and for setting them on the set carrier; and a roof panel setting device for setting a roof panel between roof side rails of the right and left side panels which have been set on the set carrier;

each of the side panel setting devices being provided with a jig for positioning and holding the side panel, the jig being provided on a lifting frame so as to be advanced and retracted in a lateral direction, wherein the side panel is received from the hanger by lateral advancing and retreating of the jig at a lifted position of each of the lifting frames and the side panel is set on the set carrier by lateral advancing and retreating of the jig at a lowered position of each of the lifting frames, and a means for laterally moving the jig to advance and retreat;

the roof panel setting device being disposed in a laterally central portion at an upper part of the setting station; and a charging device disposed on one side of the setting station, the charging device having a setting frame on which the roof panel can be placed and which can be movble to advance and retreat in a lateral direction facing the setting station such that the roof panel can be received by the roof panel setting device via the setting frame and a means for moving the setting frame to advance and retreat in the lateral direction.

In this case, it is preferable to provide vertically elongate and vertically movable lifting bars on an apparatus frame which is provided at a side upper portion of the setting station, and to support the lifting frame of the side panel setting device on the lifting bar in a vertically movable manner.

According to another feature of this invention, in order to attain the second object of this invention, a dash board upper piece setting device and a rear tray piece setting device are respectively provided in front of and at the rear of the roof panel setting device in the laterally central portion at the upper part of the setting station, and receiving portions for the dash board upper piece and the rear tray piece are respectively provided on the setting frame in front of and at the rear of a receiving portion on which the roof panel is placed.

After the set carrier has been sent out of the setting station, each of the jigs of the side panel setting devices is lifted. Side panels are then received by the jigs from the hanger. At the same time, the setting frame on which the roof panel, the dash board upper piece and the rear tray piece have previously been set, is advanced into the setting station, and the roof panel, the dash board upper piece and the rear tray piece are received respectively by the roof panel setting device, the dash board upper piece setting device and the rear tray piece setting device. Then, the setting frame is retracted to the side of the setting station, and each of the jigs is lowered.

When the set carrier is returned to the setting station, the floor panel is set on the set carrier by the floor panel setting device. Then, after the dash board upper piece and the rear tray piece are lowered to a predetermined position by the respective setting devices, the above-mentioned jigs are laterally advanced inward to set the right and left side panels on the set carrier such that the floor panel, the dash board upper piece and the rear tray piece are placed between the side panels. Finally, by the operation of the roof panel setting device, the roof panel is inserted in position from above between the roof side rails of the right and left side panels. Thereafter, the set carrier carrying the motorcar body components is sent out of the setting station to complete one cycle of the setting work.

According to this invention, since the side panels are set onto the set carrier while they are held by the vertically moving jigs, it is not necessary to provide stationary setting jigs for the side panels at the sides of the setting station, as was the case with the conventional assembling line. Once the jigs are lifted, there is no obstacle at the side of the setting station. Therefore, the setting frame may be advanced to, and retreated from, the setting station at a relatively low level. Additionally, since the setting frame may only be provided with receiving portions on which the roof panel and the like are placed, it can be constructed lighter in weight than the setting jig provided with clampers and the like. The charging device can be constructed on a small scale, and the side spaces of the setting station can be made narrower.

In order to prevent any interference between the supporting members such as the supporting columns which support the lifting frame of the side panel setting device in a vertically movable manner, and the setting frame, it may be considered to vertically erect a supporting member at a rear side portion of the setting station or to provide the apparatus frame at an upper side portion of the setting station in order to vertically provide the supporting member thereon. However, in the former case, it is necessary to largely extend the lifting frame in front of the supporting member so as to mount the jig at the tip portion thereof. Then, the lifting frame tends to incline downwards towards its front end, thereby giving rise to a deteriorated positioning accuracy of the jig. In the latter case, on the other hand, since the lowered end of the lifting frame becomes relatively as high as the same level as the apparatus frame, the jig must be attached to the lifting frame such that the jig extends relatively far below the lifting frame. As a result, when the jig is lifted to a lifted position, the lifting frame must be lifted considerably higher than the lifted position of the jig. The height to the upper end of the supporting members must consequently be made considerably large, and the apparatus will no longer be able to be installed in a place having a low ceiling height.

In order to solve this kind of problem, according to another feature of this invention, vertically elongate lifting bars which are movable upwards and downwards are provided on the apparatus frame which is provided in an upper side portion of the setting station, and the lifting frame is made to be supported by the lifting bars so as to be movable upwards and downwards relative thereto. According to this construction, even if the lifting bar is lowered below the apparatus frame at the time of lowering the jig to a lowered position, the above-mentioned setting frame can be advanced into, and retreated from, the setting station without interference with the lifting bar by lifting the lifting bar at the time of lifting of the jig to a lifted position. In this manner, it becomes possible to lower the lifting frame, at the time of lowering of the jig, to a position lower than the apparatus frame, guided by the lifting bar. As a result, it is not necessary to maintain a large difference in height between the lifting frame and the jig, and it becomes possible to limit the lifting height relatively low at the time when the jig is lifted to a lifted position. The apparatus can, therefore, be installed in a space having a low ceiling.

Additionally, since the jig can be moved upwards and downwards by the vertical movements of the lifting bar as well as by the vertical movements of the lifting frame relative to the lifting bar, it is possible to increase the velocity of the vertical movements of the jig, thereby improving the efficiency.

As shown in FIGS. 26 through 28, in the above-mentioned conventional assembling line, the jig of the side panel setting device is composed of: a jig main body b which is supported on a lifting frame a so as to be laterally advanced and retracted by a cylinder $b_1$; V-shaped hooks c for supporting a side panel $W_2$ in a suspended manner at its roof side rail $W_{2a}$, the hooks c being pivotally mounted on the jig main body b and vertically swingable by a cylinder $c_1$; a clamping member d for clamping a center pillar $W_{2c}$ from front and rear sides thereof, the clamping member d being mounted on a movable frame $d_2$ which can be advanced and retracted slantingly downwards in the laterally inward direction by a cylinder $d_1$, and being opened and closed by a cylinder $d_3$; a swingable frame $e_2$ which is swung by a cylinder $e_1$ and which is provided on a bracket $b_2$ in a suspended manner at a rear end portion of the jig main body b; and an engaging member e which engages with the rear fender $W_{2d}$ such that it can be advanced and retracted by a cylinder $e_3$. After the jig has been lifted by the lifting frame a to the same level as the hanger and the jig main body b has been advanced in the laterally inward direction, the hooks c are first swung upwards to scoop up the roof side rail $W_{2a}$ of the side panel $W_2$ from being held by the hanger in a suspended manner.

Then, by moving the movable frame $d_2$ forwards in the laterally inward direction and closing the clamping member d to clamp the center pillar $W_{2c}$, the side panel $W_2$ is positioned in the longitudinal direction. Next, by swinging of the swingable frame $e_2$, the engaging member e is swung into the rear fender $W_{2d}$ to engage the two together. The engaging member e is then pulled by the cylinder $e_3$ laterally outward. In this manner, the side panel $W_2$ is positioned in the lateral direction by changing its posture from a hanging posture to a set posture in which the side panel $W_2$ is slightly inclined inward.

In this prior art arrangement, since the posture of the side panel $W_2$ is changed from the hanging posture to the set posture by the engaging member e, the engaging member e must be largely moved. This brings about a problem in that the mechanism for moving the engaging member e needs be large and complex. Further, in order to comply with the change in posture of the side panel, the above-mentioned mechanism for moving the clamping member d comprising the movable frame $d_2$ becomes necessary, and this brings about a problem in that the set jig becomes complicated in construction and expensive.

Further, in the above arrangement, the roof side rail $W_{2a}$ of the side panel $W_2$ is suspended by the V-shaped hooks c. In this case, in order to allow for the inclination movement of the roof side rail $W_{2a}$ on the hook c due to the change in posture of the side panel $W_2$, it is necessary to form the hooks c to have some play in the lateral direction relative to the roof side rail $W_{2a}$. This results in a problem in that the roof side rail $W_{2a}$ laterally displaces, with a consequent poor positioning accuracy of the side panel $W_2$.

In order to solve these problems, according to another feature of this invention, the lifting frame of the side panel setting device is provided with a laterally movable sliding frame. The jig which has positioning members for positioning the side panel in the longitudinal and the lateral directions as well as hanging members for suspending the side panel at its roof side rail, is supported such that it can be tilted about a longitudinal axis of the sliding frame. Each of these hanging members is composed of: a laterally elongate guide piece which slidably supports the flange portion of the bottom end of the roof side rail; a clamp seat at the base end of the guide piece which receives the external side of the flange portion; and a clamping piece which clamps the flange portion between the clamping seat and the clamping piece such that the clamping piece is movable in the lengthwise direction of the guide piece.

In handing over the side panel, the jig is lifted by the lifting frame to a position corresponding to the side of the side panel which is suspended by the hanger. Then, the jig is advanced by the sliding frame in a lateral inward direction towards the side panel. After the guide piece of the hanging member is inserted into a lower space of the roof side rail of the side panel, the jig is slightly tilted so that it may lie along the side panel which is in a hanging posture. According to this operation, the guide piece is tilted with its front end pointing upwards. The roof side rail is scooped up by the guide piece off of the hanger. The side panel is hung down from the guide piece in a hanging posture to lie along the jig. As a result, even if the positioning member in the longitudinal direction and the positioning member in the lateral direction are not laterally movable by a moving mechanism, the positioning portions of each side panel are respectively made to face these positioning members. Therefore, even if these positioning members are fixedly provided on the jig, the side panel can be positioned in the longitudinal direction as well as in the lateral direction with these positioning members when the jig is tilted. Additionally, by closing the clamping member of the hanging member, the flange portion at the bottom of the roof side rail can be clamped between the clamping seat and the clamping member, guided by the guide member, thereby positioning the roof side rail in the lateral direction.

As mentioned above, after the side panel has been held by positioning by the jig, the jig is tilted towards the opposite direction to that mentioned above in order to change the posture of the side panel from the hanging posture to a predetermined set posture. Then, the jig is lowered, thus completing the setting work of the side panel.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 4 is an enlarged front view of a side panel setting device.

FIG. 6 is a plan view thereof with the jig omitted.

DETAILED DESCRIPTION OF A PREFERRED EMBODIMENT

Figure 25:
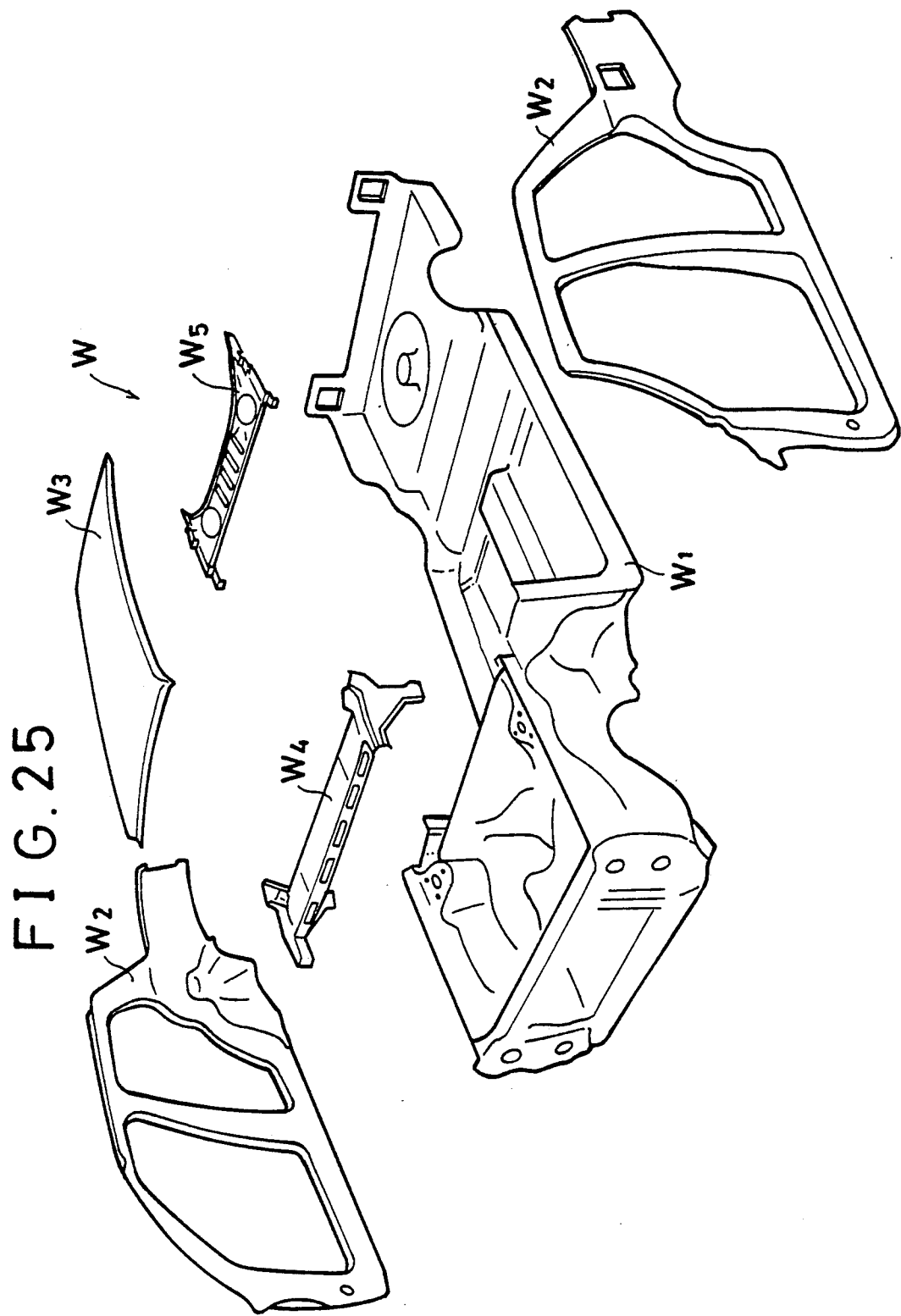
FIG. 25 is an exploded perspective view of the major components of a motorcar body.
Figure 26:
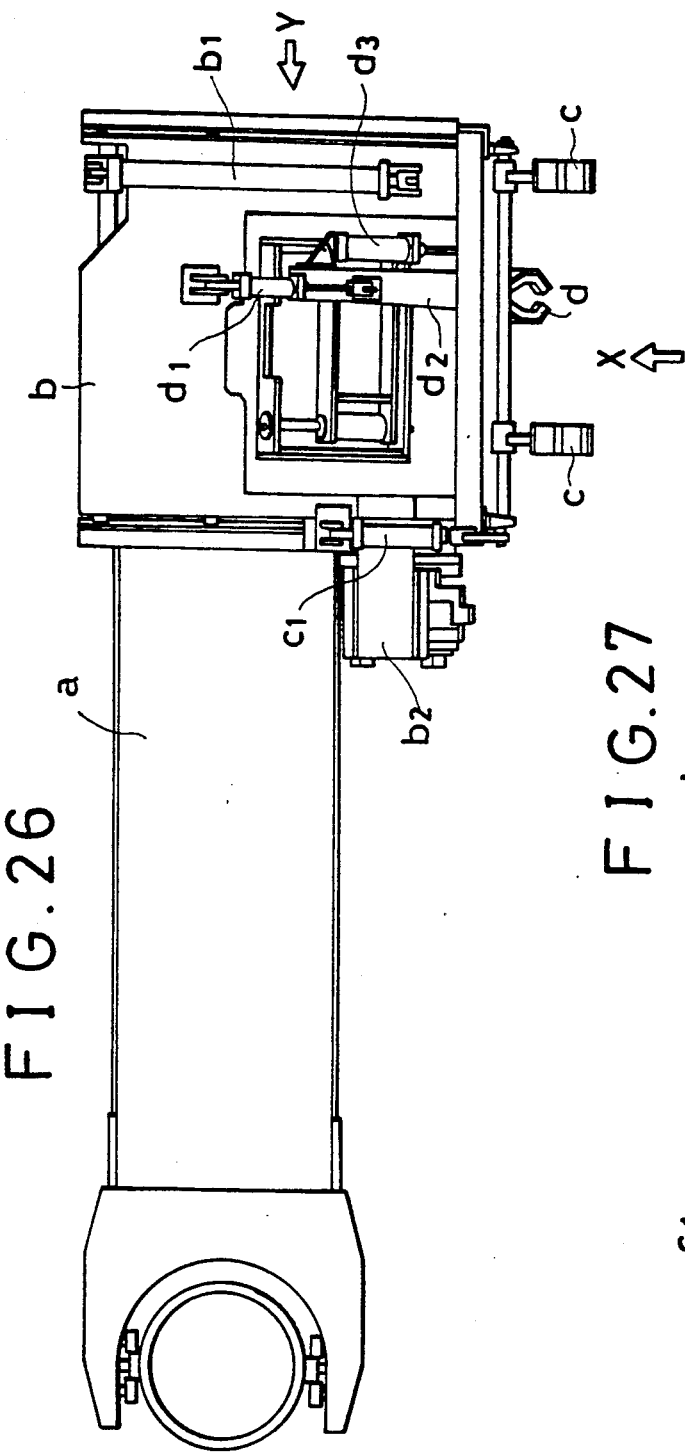
FIG. 26 is a plan view of a conventional side panel setting device.
Figure 27:
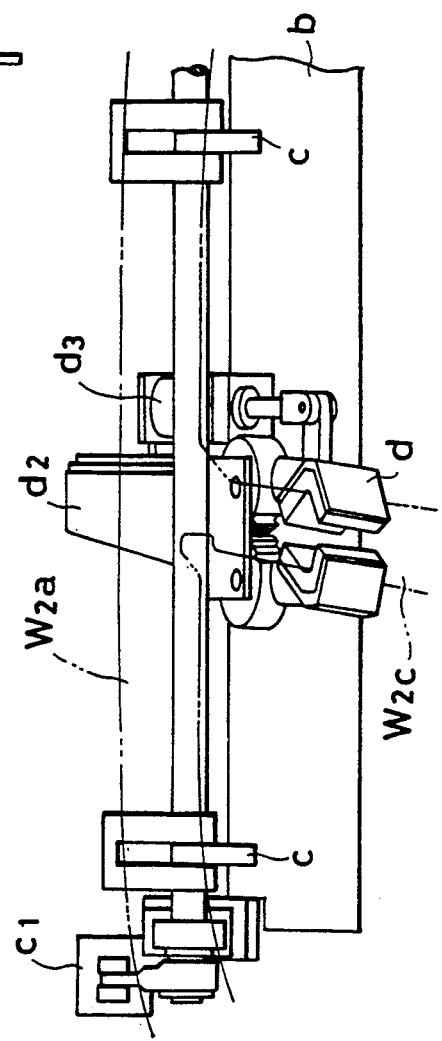
FIGS. 27 and 28 are a side view and a front view, respectively, as seen from X-direction and Y-direction of FIG. 26.
Figure 28:
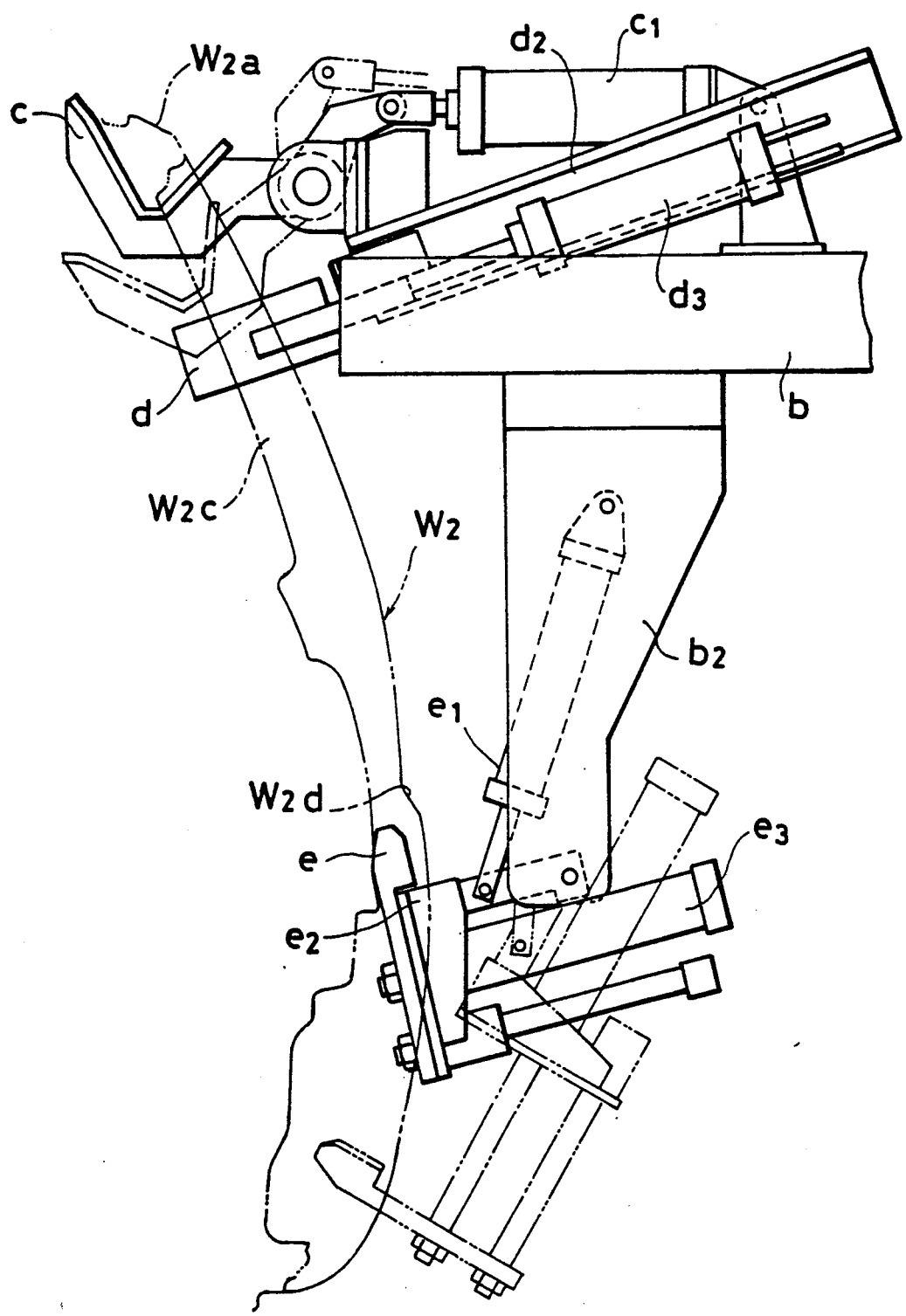

The drawings show an embodiment of an apparatus of this invention as applied to an assembling line for assembling a motorcar body W by welding together a floor panel $W_1$, right and left side panels $W_2$, $W_2$, a roof panel $W_3$, a dash board upper piece $W_4$ and a rear tray piece $W_5$ as shown in FIG. 25.

Figure 1:
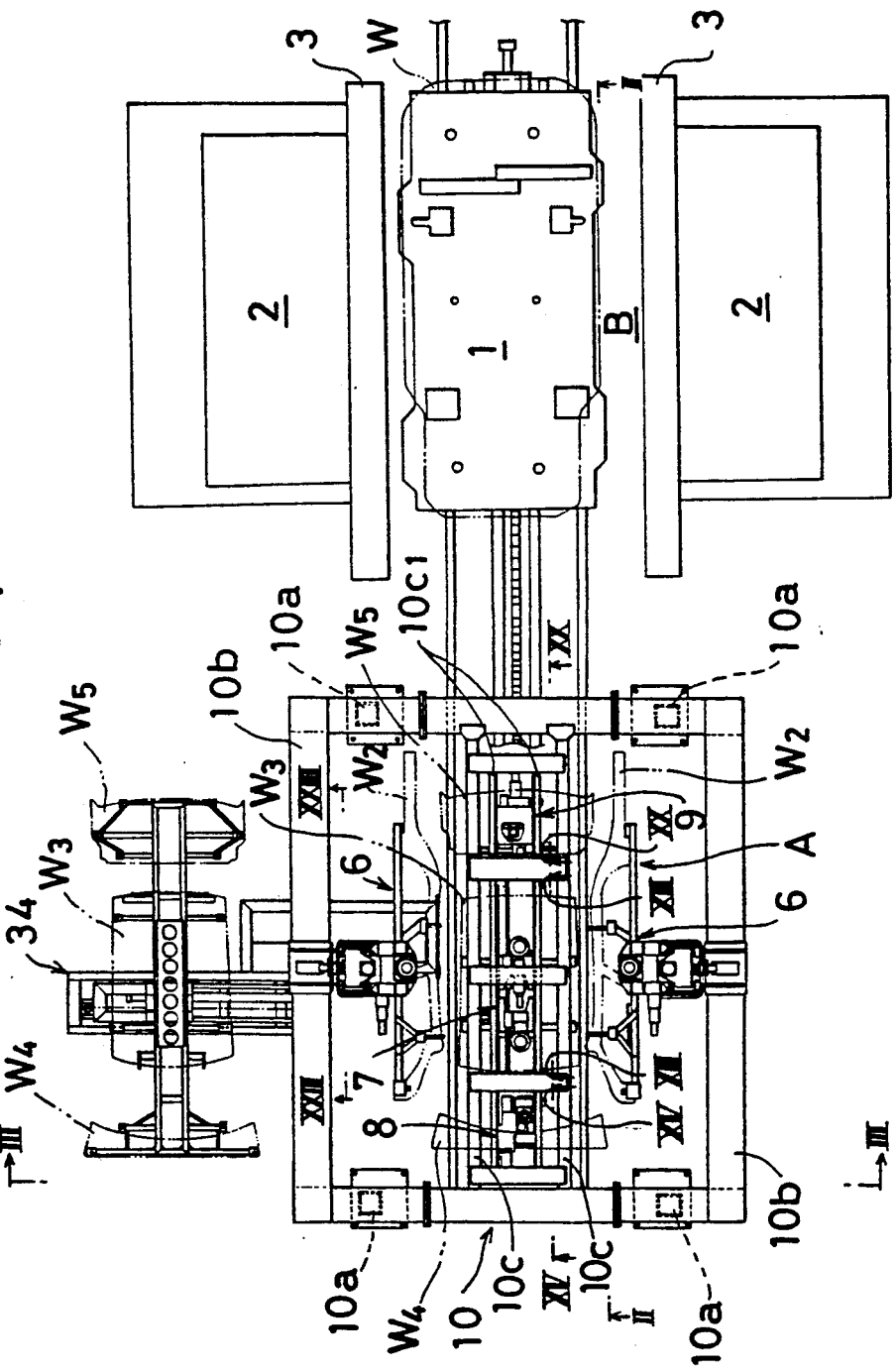
FIG. 1 is a plan view of a car body assembling line provided with an embodiment of the present invention.
Figure 2:
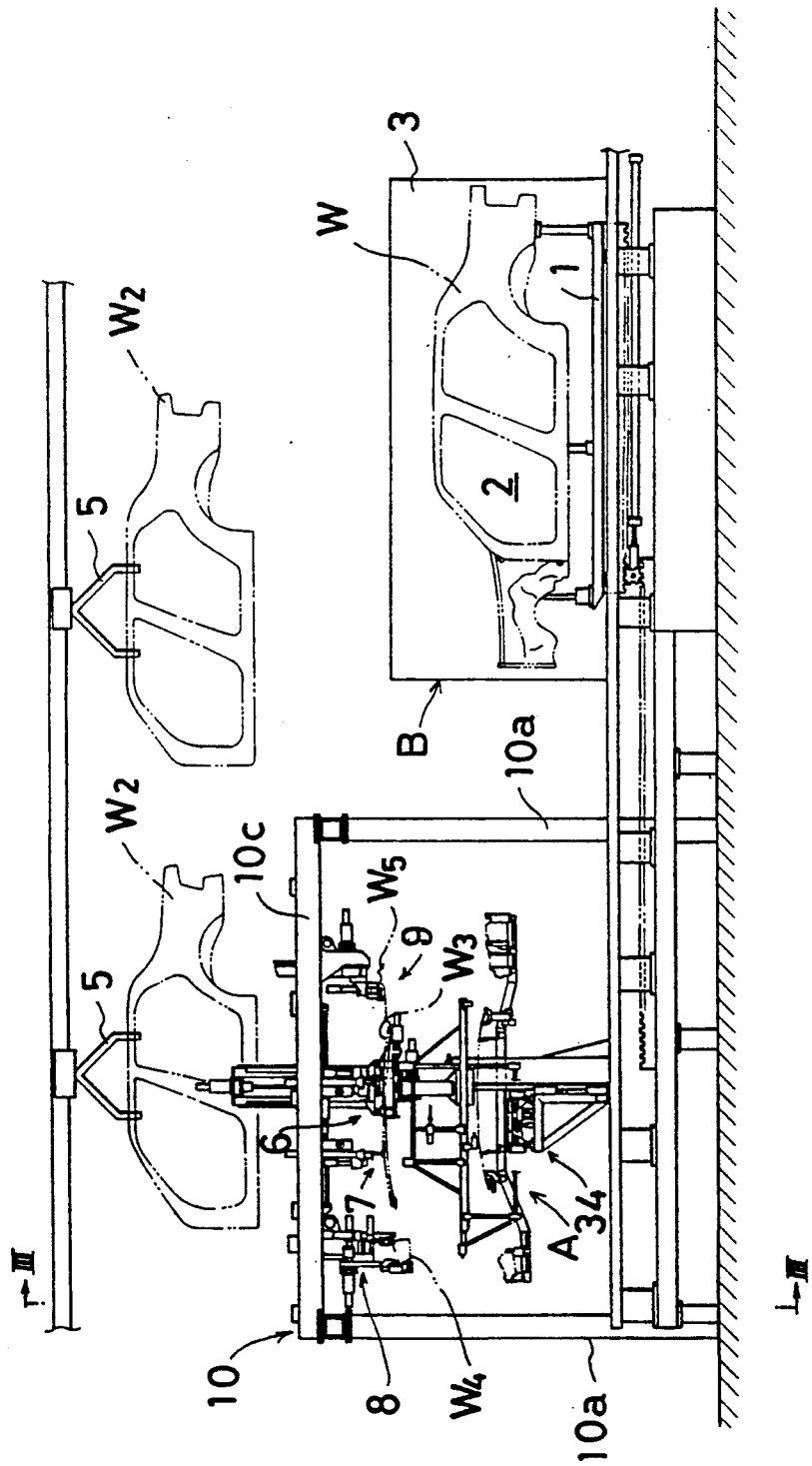
FIG. 2 is a side view as seen from the line II—II in FIG. 1.
Figure 3:
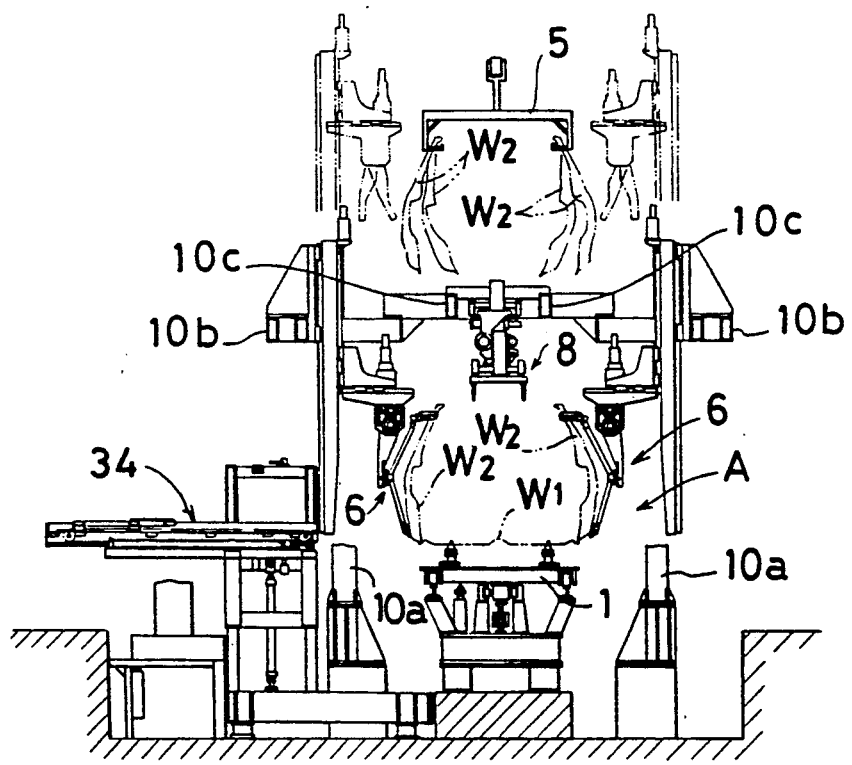
FIG. 3 is a front view of a setting station as seen from the line III—III in FIG. 1.

With reference to FIGS. 1 through 3, a set carrier 1 is provided in a reciprocating manner between a setting station A at a starting end of the assembling line and a welding (assembling) station B downline of the setting station. A pair of welding devices 2 are provided on both sides of the welding station B. A welding jig 3 is provided on each of the welding devices 2 and is movable to advance and retreat in the lateral direction. In the setting station A, car body components such as the floor panel $W_1$, the side panels $W_2$, the roof panel $W_3$, and the like are set on the set carrier 1 in a predetermined positional relationship. Then, these car body components are transferred to the welding station B under the set condition while the right and left side panels $W_2$, $W_2$ are clamped by clamping members (not shown) provided on the set carrier 1. In the welding station B, the car body components are handed over to the welding jigs 3, 3, which assemble the car body components by welding to complete a car body framework W. The car body framework W is transferred by a transfer bar, which is outside the figure, to a discharging station (not shown) downline of the welding station B and then transferred to an additional welding line from the discharging station.

The above construction is not particularly different from the aforementioned conventional one and, therefore, detailed explanation thereof is omitted. A description is made hereinbelow of an apparatus for setting to be provided in the setting station A for setting the car body components.

The apparatus for setting is composed of: a floor panel setting device (not shown) comprising a transfer bar which introduces and sets a floor panel $W_1$ from the rear side of the setting station A onto the set carrier 1; a pair of right and left side-panel setting devices 6, 6 which receive a pair of right and left side panels $W_2$, $W_2$ transported by a hanger 5 to an upper position of the setting station A and set them onto the set carrier 1; and a roof panel setting device 7, a dash board upper piece setting device 8, and a rear tray setting device 9 which respectively insert and set a roof panel $W_3$, a dash board upper piece $W_4$ and a rear tray piece $W_5$ between the right and left side panels $W_2$, $W_2$ from an upper position.

Figure 5:
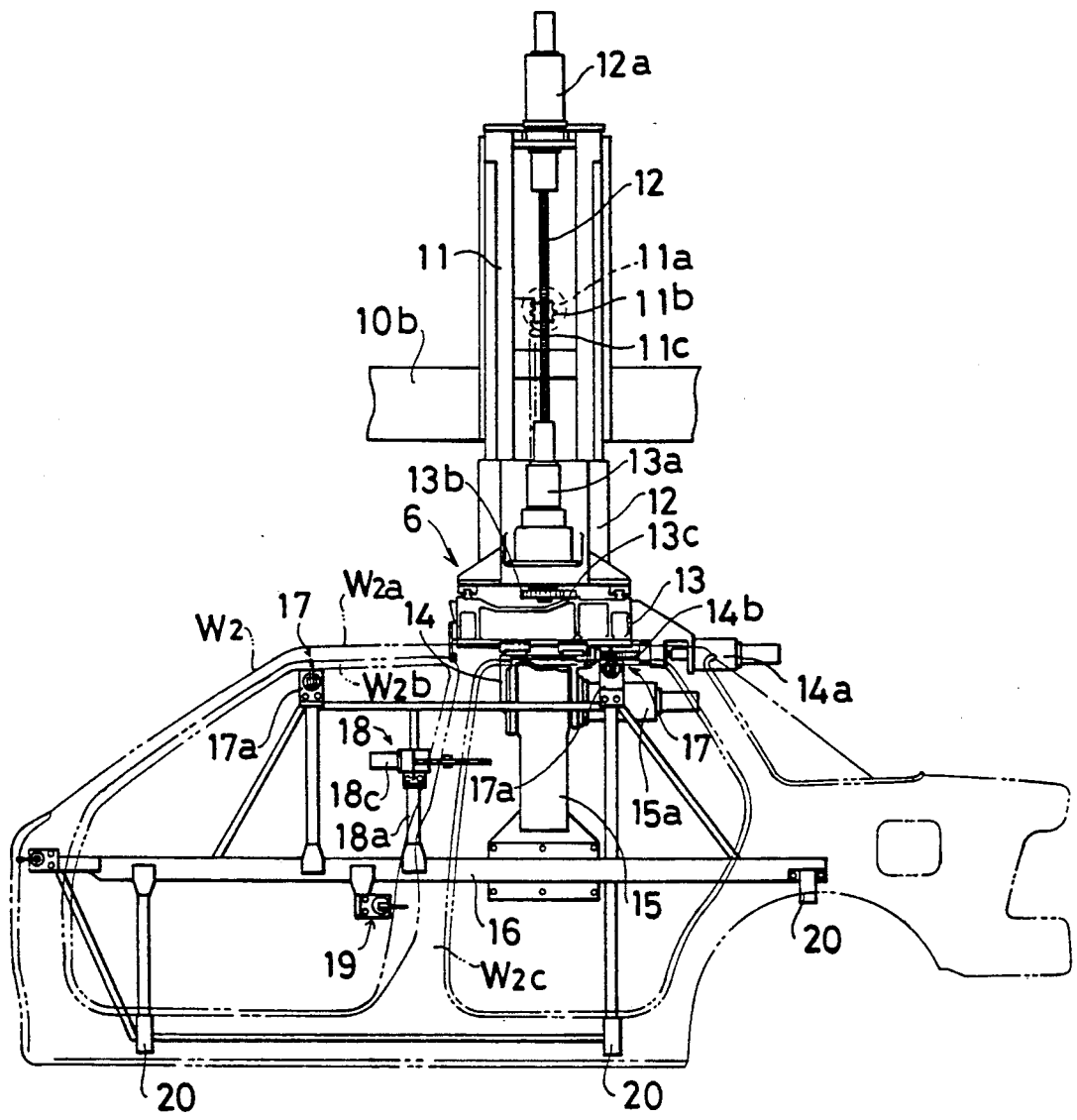
FIG. 5 is a left side view of the side panel setting device shown in FIG. 4.

A rectangular form apparatus frame 10 is provided in the setting station A and has supporting columns 10a on the four corners and left-side and right-side beam frames 10b. Details are shown in FIGS. 4 through 6. The side panel setting devices 6 are mounted on the right-side and left-side beam frames 10b of the apparatus frame 10. A vertically elongate lifting bar 11 is attached to a bracket $10b_1$ on each beam frame 10b.

The lifting bar 11 is vertically movable by an electric motor 11a provided on the bracket $10b_1$ by operation of a pinion 11b and a rack 11c. A lifting frame 12 is attached to each lifting bar 11 and is vertically movable by an electric motor 12a mounted on an upper end of the bar 11 which drives a ball thread 12b engaged with a ball screw on the lifting frame 12. A first sliding frame 13 is attached to the bottom of the lifting frame 12, and is laterally movable to advance and retreat by an electric motor 13a provided on the lifting frame 12, through operation of a pinion 13b and a rack 13c. A second sliding frame 14 is attached to the bottom of the first sliding frame 13 and is longitudinally movable to advance and retreat by an electric motor 14a provided on the first slide frame 13, through operation of ball threads 14b and ball screws. A swingable arm 15 is pivotally mounted in a suspended manner on the second sliding frame 14 and can be laterally swung about a longitudinally extending axis by an electric motor 15a which is mounted on the second sliding frame 14. A jig 16 for holding the side panel $W_2$ is attached to the swingable arm 15.

In the above-described construction, the jig 16 is given: highspeed lifting and lowering movements, by the lifting and lowering of the lifting bar 11 as well as the lifting and lowering of the lifting frame 12 relative to the lifting bar 11, between a lifted position in which the side panel $W_2$ is received from the hanger 5 and a lowered position in which the side panel $W_2$ is set onto the set carrier 1; advancing and retreating movements in the lateral direction by the first sliding frame 13; adjustment of position in the longitudinal direction by the second sliding frame 14 in compliance with the kind of workpiece; and tilting about a longitudinal axis by the swingable arm 15.

The jig 16 is provided with: a pair of front and rear hanging members 17 for supporting the side panel $W_2$ at its roof side rail $W_{2a}$; a positioning member 18 for positioning the side panel $W_2$ in the longitudinal direction (hereinafter referred to as "longitudinal positioning member"); a positioning member 19 for positioning the side panel $W_2$ in the lateral direction (hereinafter referred to as "lateral positioning member"); and a plurality of pads 20 for supporting the lower external side of the side panel $W_2$, thereby supporting the side panel $W_2$ in a predetermined positional relationship.

Figure 7:
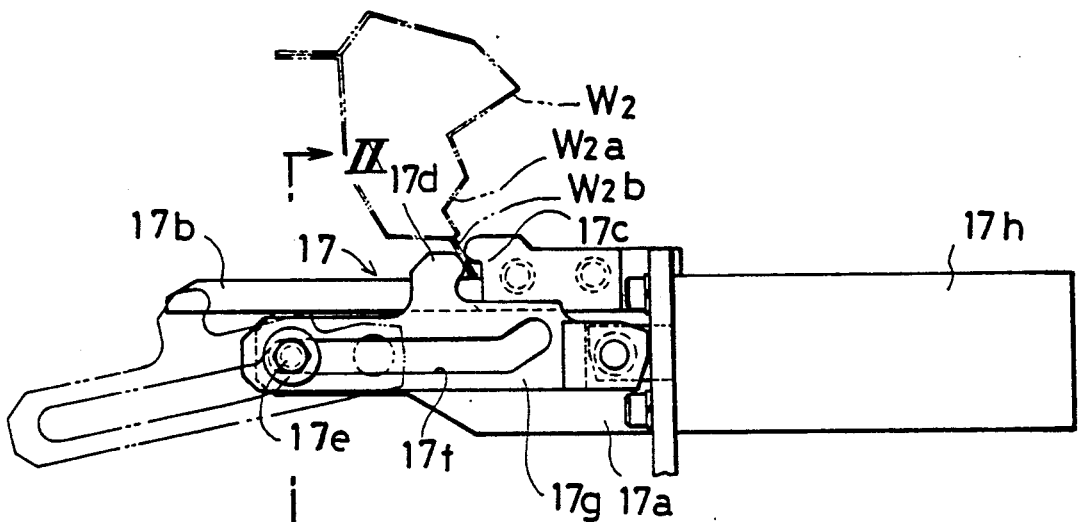
FIG. 7 is an enlarged side view of a hanging member provided on the jig.
Figure 8:
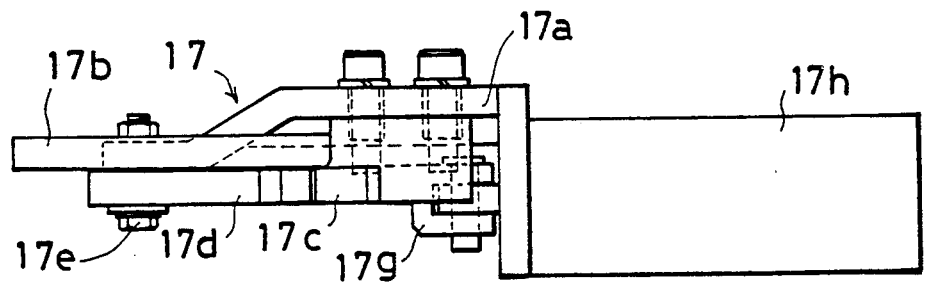
FIG. 8 is a plan view thereof.
Figure 9:
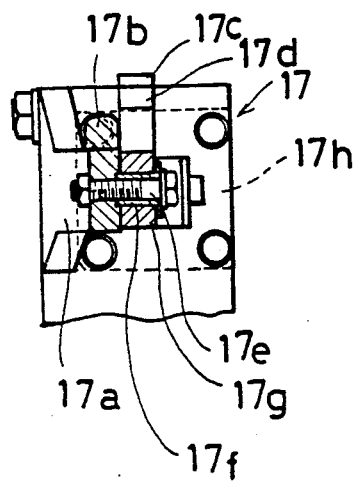
FIG. 9 is a sectional view taken along the line IX—IX of FIG. 7.

As shown in FIGS. 7 through 9, each of the hanging members 17 has a bracket 17a which is fixed to the jig 16. A laterally elongate guide piece 17b which slidably supports a flange portion $W_{2b}$ of the bottom end of the roof side rail $W_{2a}$, and a clamping seat 17c at the base end of the guide piece 17b which receives the external side of the flange portion $W_{2b}$ are fixedly provided to the bracket 17a. Further, a clamping piece 17d which clamps the flange portion $W_{2b}$ between the clamping seat 17c and itself is movable in the lengthwise direction of the guide piece 17b, i.e., in a lateral direction, to an open or closed position. The clamping piece 17d is integrally provided in a projecting manner on an upper edge of a sliding plate 17g. The sliding plate 17g has a laterally elongate cam groove 17f through which a guide pin 17e fixed to the bracket 17a penetrates. The clamping piece 17d is movable to an open or closed position by laterally moving the sliding plate 17g to advance and retreat by action of a cylinder 17h provided at the base end of the bracket 17a, guided by the cam groove 17f. The cam groove 17f is formed so that the sliding plate 17g is tilted downwards in a laterally inward direction at the end of the opening stroke of the cylinder 17h, and so that the clamping piece 17d sinks below the guide piece 17b at the end of the opening stroke of the cylinder 17h. In this manner, the clamping piece 17d does not interfere with the flange portion $W_{2b}$ when the guide piece 17b is inserted into, or withdrawn from, the lower space of the roof side rail $W_{2a}$ by laterally moving the jig 16 to advance and retreat.

The angle at which the flange portion $W_{2b}$ extends outward varies with the particular model and kind of car. Therefore, the confronting surfaces of the clamping seat 17c and the clamping piece 17d are made to be arcuate in their vertical cross sections so that the flange portion $W_{2b}$ may be securely clamped irrespective of the angle of outward extension.

Figure 10:
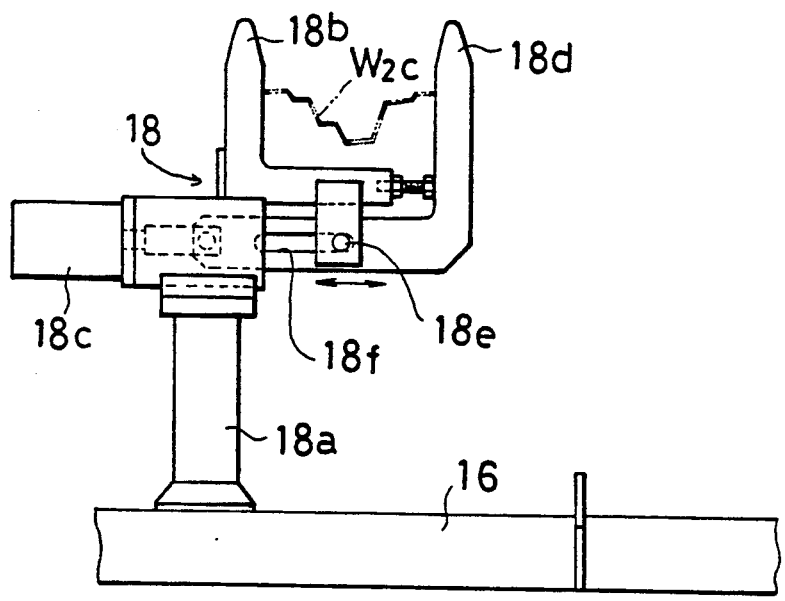
FIG. 10 is an enlarged plan view of a longitudinal positioning member provided on the jig.

As shown in FIG. 10, the longitudinal positioning member 18 comprises a bracket 18a fixed to the jig 16, a stationary pin 18b on the bracket 18a which receives one of front or rear side edge of the center pillar $W_{2c}$ of the side panel $W_2$, and a clamping pin 18d movably mounted on the bracket 18a. The clamping pin 18d is moved by a cylinder 18c back and forth relative to the stationary pin 18b for opening and closing operation. The longitudinal positioning member 18 thus operates to fix the position of the side panel $W_2$ in the longitudinal direction by clamping the center pillar $W_{2c}$ between the pins 18b, 18d from the front and rear thereof. A guide pin 18e is provided on the stationary pin 18b and engages a guide hole or slot 18f in the clamping pin 18d to guide the opening and closing operation of the clamping pin 18d.

Figure 11:
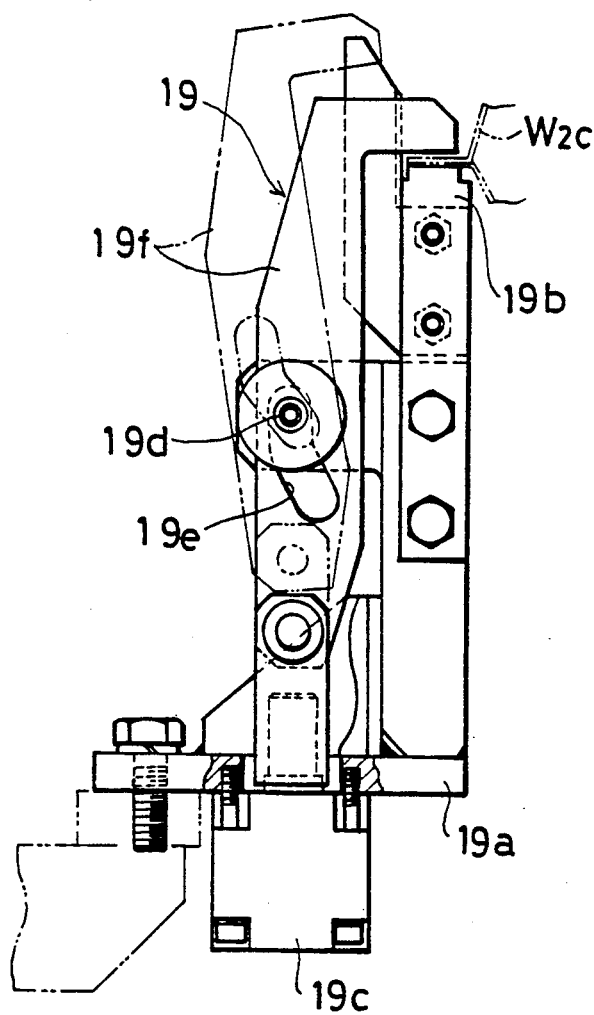
FIG. 11 is an enlarged plan view of a lateral positioning member provided on the jig.

As shown in FIG. 11, the lateral positioning member 19 comprises a bracket 19a fixed to the jig 16, a clamping seat 19b on the bracket 19a which receives the front lower flange of the center pillar $W_{2c}$, and a clamping piece 19f which is opened and closed by operation of a cylinder 19c, guided by a cam groove 19e through which a guide pin 19d fixed to the bracket 19a penetrates. The positioning member 19 operates to fix the lateral position of the side panel $W_2$ by clamping a front lower flange of the center pillar $W_{2c}$ between the clamping seat 19b and the clamping piece 19f.

In order to receive the side panel $W_2$ from the above-mentioned hanger 5, the jig 16 is first lifted to a lifted position and is advanced in a lateral inward direction. The guide piece 17b of the hanging member 17 is inserted into a lower space of the roof side rail $W_{2a}$ of the side panel $W_2$ which is suspended on the hanger 5. Then, the jig 16 is slightly moved upwards and, at the same time, the swingable arm 15 is swung laterally inward so that the jig 16 is tilted to lie along the side panel $W_2$ which is in a hanging posture. In this operation, the guide piece 17b is tilted, with its front end pointing upwards, towards the lateral inward direction, and the roof side rail $W_{2a}$ is scooped up by the guide piece 17b off of the hanger 5. The side panel $W_2$ is hung down from the guide piece 17b to lie along the jig 16, and the center pillar $W_{2c}$ is inserted into the space between the stationary pin 18b and the clamping pin 18d of the longitudinal positioning member 18. Further, the front lower flange of the center pillar $W_{2c}$ faces the clearance between the clamping seat 19b and the clamping piece 19f of the lateral positioning member 19. The clamping pin 18d of the longitudinal positioning member 18 is first operated to be closed to thereby fix the positioning in the longitudinal direction of the side panel $W_2$ by longitudinally clamping the center pillar $W_{2c}$. Next, the clamping piece 17d of the hanging member 17 and the clamping piece 19f of the lateral positioning member 19 are operated to be closed for laterally clamping the lower end flange portion $W_{2b}$ of the roof side rail $W_{2a}$ and the front lower flange of the center pillar $W_{2c}$, thereby laterally fixing the position of the side panel $W_2$ in a posture to lay the side panel $W_2$ along the jig 16.

After the jig 16 is slightly moved upwards, moved laterally inward by a small stroke, and slightly lowered, it is moved backwards in the lateral outward direction. The swingable arm 15 is then swung back to the vertically suspended position to return the jig 16 to a predetermined erected posture. In this operation, the side panel $W_2$ is tilted together with the jig 16 to change it to a predetermined set posture, and the jig 16 is subsequently lowered to a lowered position and is advanced to a lateral inward direction to set the side panel $W_2$ onto the set carrier 1.

The roof panel $W_3$ setting device 7, the dash board upper piece $W_4$ setting device 8 and the rear tray piece $W_5$ setting device 9 are provided in a longitudinal row on the beam frames 10c which are longitudinally provided in the laterally central portion of the apparatus frame 10, in the following order, facing the front thereof, of the dash board upper piece setting device 8, the roof panel setting device 7 and the rear tray piece setting device 9.

Figure 12:
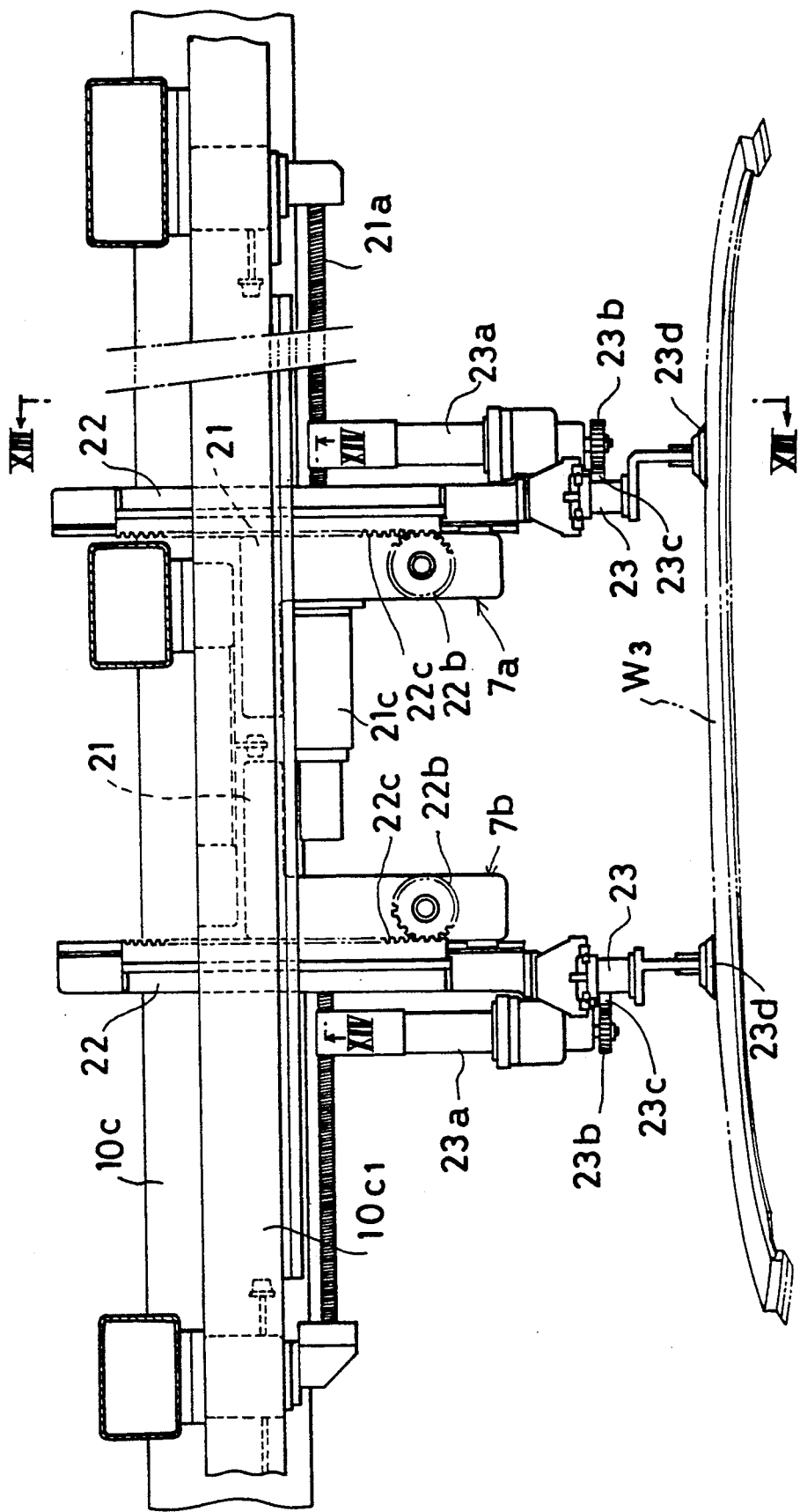
FIG. 12 is an enlarged side view of a roof panel setting device as seen from the line XII—XII in FIG. 1.
Figure 13:
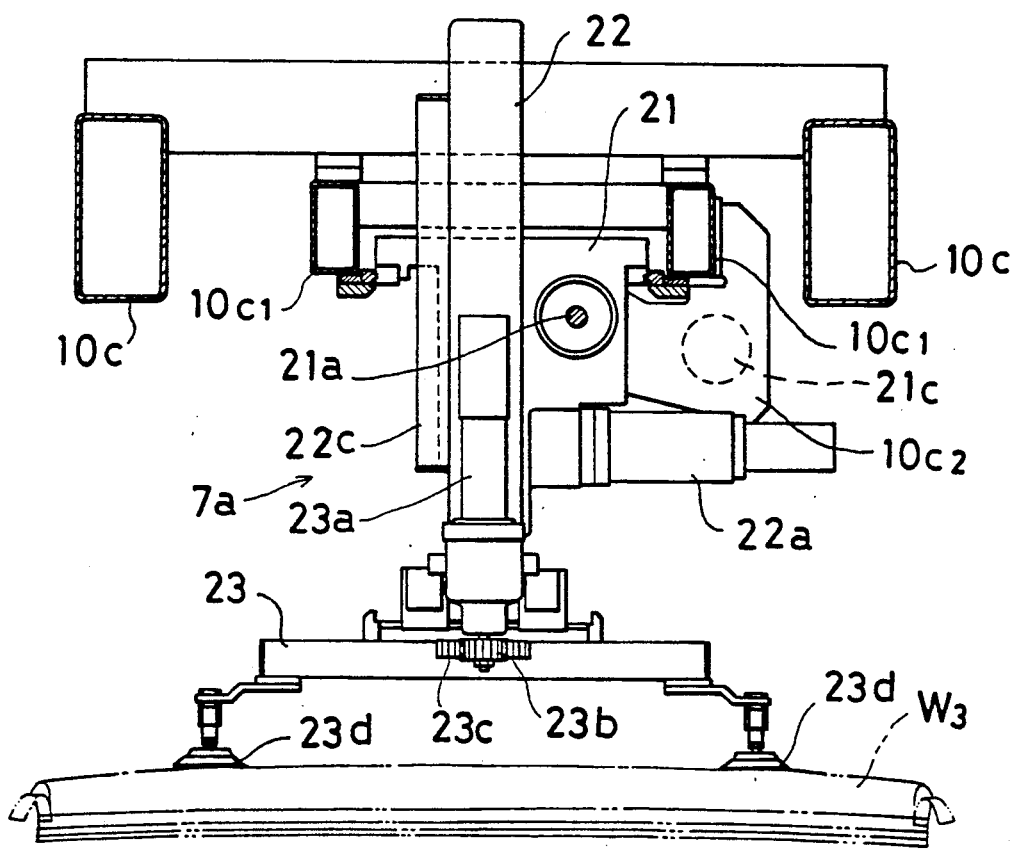
FIG. 13 is a sectional front view thereof taken along the line XIII—XIII of FIG. 12.
Figure 14:
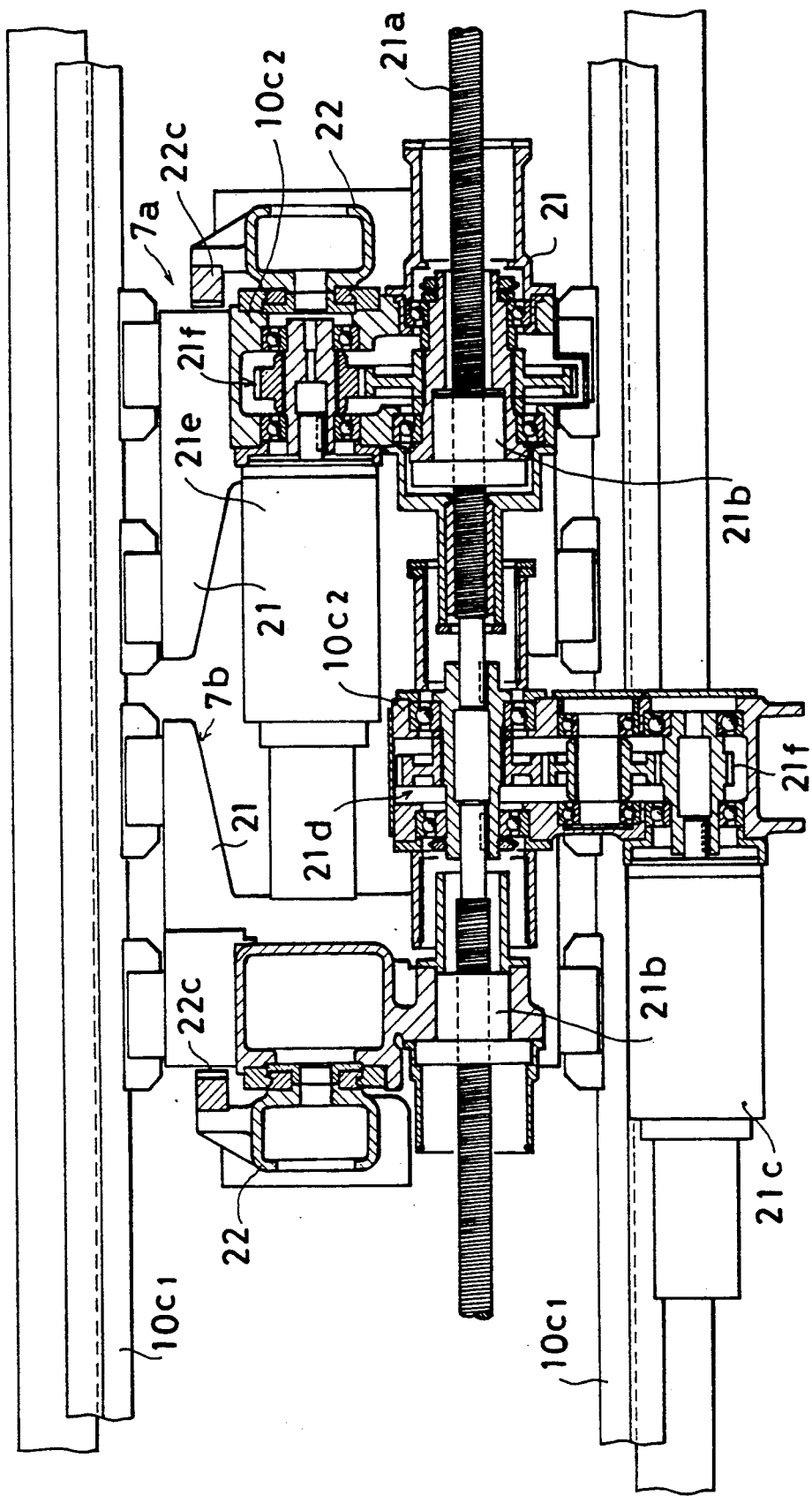
FIG. 14 is a sectional side view thereof taken along the line XIV—XIV of FIG. 12.

The roof panel setting device 7 comprises a pair of front and rear units 7a, 7b which hold the front portion and the rear portion of the roof panel $W_3$ by suction. As shown in FIGS. 12 and 13, a shifting frame 21 is supported in a longitudinally slidable manner between a pair of right and left guide frames $10_{c1}$, $10_{c1}$, mounted on the beam frame 10c. A pair of lifting frames 22 are supported on the shifting frame 21 and move upwards and downwards by individual electric motors 22a mounted on each lifting frame via a pinion 22b and a rack 22c. A laterally elongate roof panel holding frame 23 is provided in a suspended manner on the bottom of each lifting frame 22 and is laterally movable by an electric motor 23a mounted at the bottom of the lifting frame 22, via a pinion 23b and a rack 23c. A pair of right and left suction cup means 23d, 23d are provided on the bottom of each holding frame 23 to hold the roof panel $W_3$ by suction. As shown in FIG. 14, nut sleeves 21b, 21b are provided between the guide frames $10_{c1}$, $10_{c1}$ on the shifting frames 21, 21 of both units 7a, 7b through which a ball thread 21a longitudinally extends. The ball thread 21a is rotated in one direction as well as the opposite direction by an electric motor 21c through a gear train 21d inside a gear box $10_{c2}$ which is mounted on and fixed to one of the guide frames $10_{c1}$. Both units 7a, 7b are thus synchronously movable in the forward and the backward directions. Additionally, the nut sleeve 21b which is provided on the shifting frame 21 of the front unit 7a is rotated in one direction as well as the opposite direction by an electric motor 21e mounted on the shifting frame 21 via a gear train 21f so that the front unit 7a may be movable relative to the rear unit 7b. In this way, it is possible to make an adjustment in the distance between the units 7a, 7b depending on the change in the roof length and to make an adjustment in an overall positioning of both units 7a, 7b depending on a change in the roof setting position.

In performing the setting work of the roof panel $W_3$, the roof holding frames 23, 23 of both units 7a, 7b are lowered in sequence so that the roof panel $W_3$ may be gradually maneuvered from one end thereof into position between the roof side rails $W_{2a}$, $W_{2a}$ of the right and the left side panels $W_2$, $W_2$.

Figure 15:
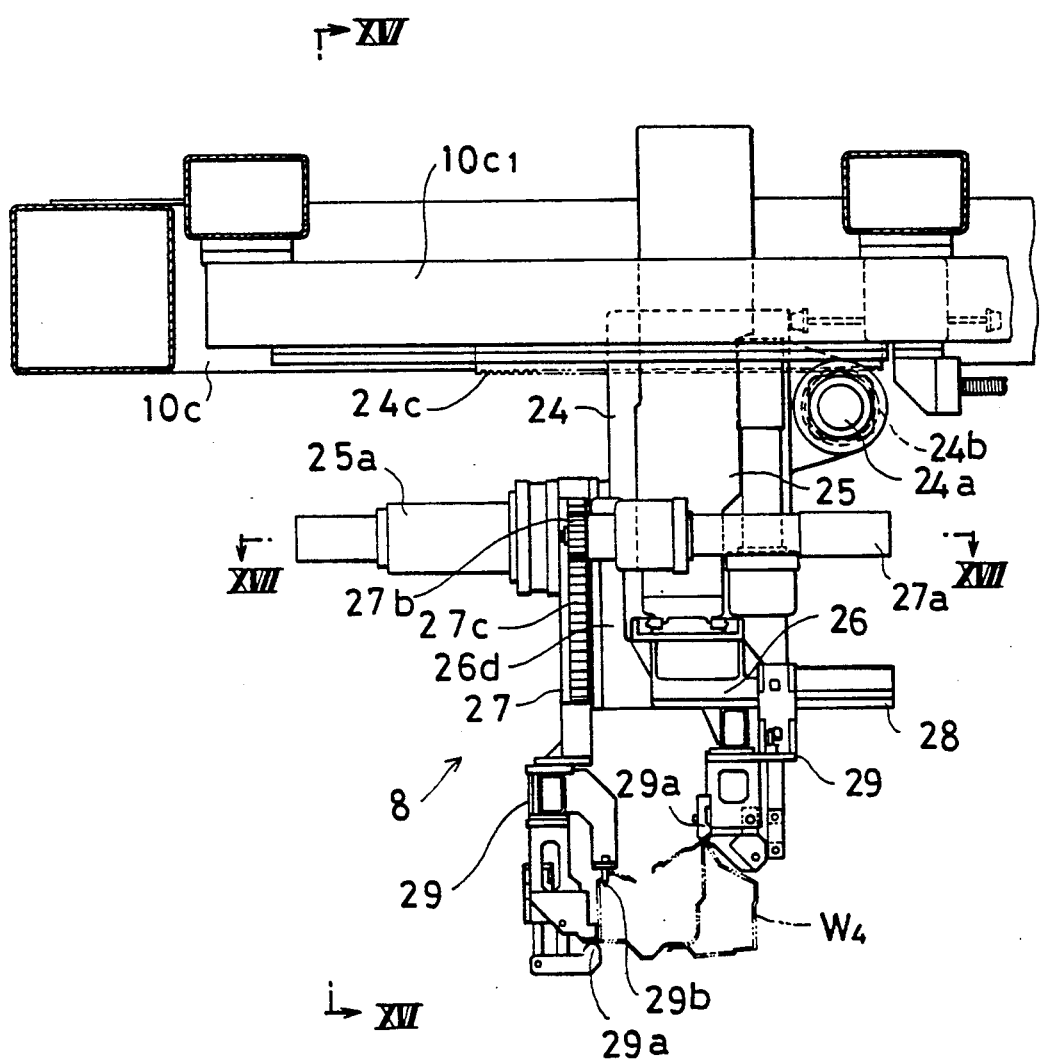
FIG. 15 is an enlarged side view of a dash board upper piece setting device as seen from the line XV—XV of FIG. 1.
Figure 16:
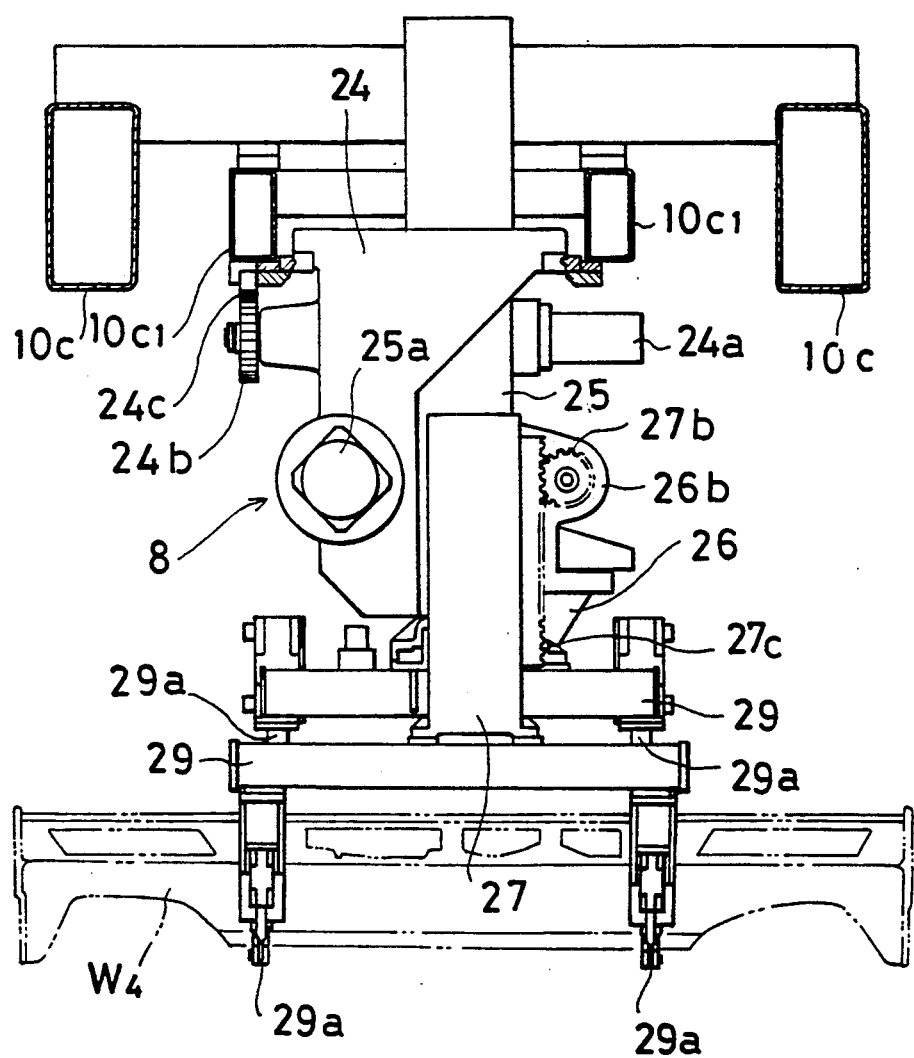
FIG. 16 is a sectional front view taken along the line XVI—XVI of FIG. 15.
Figure 17:
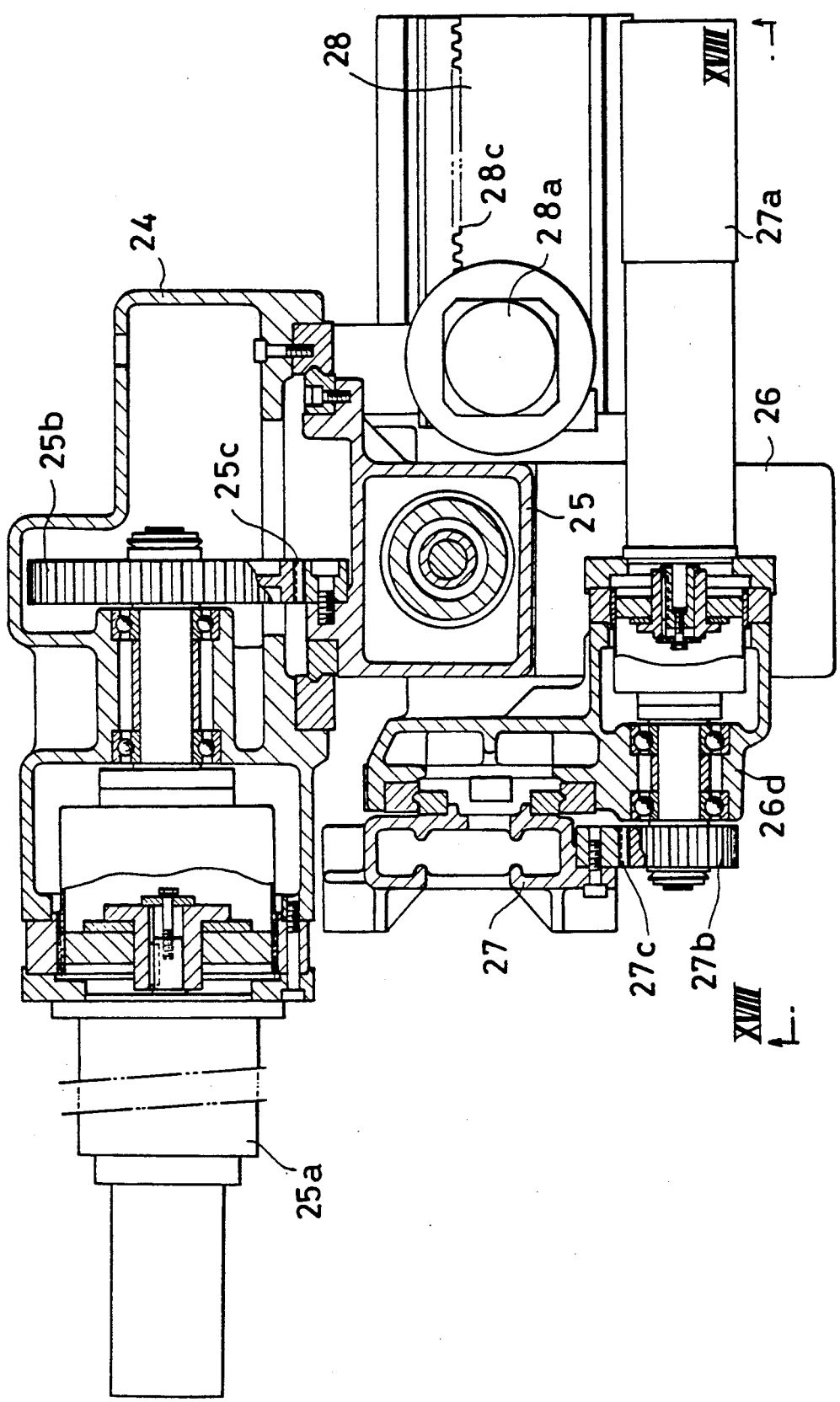
FIG. 17 is a sectional plan view taken along the line XVII—XVII of FIG. 15.
Figure 18:
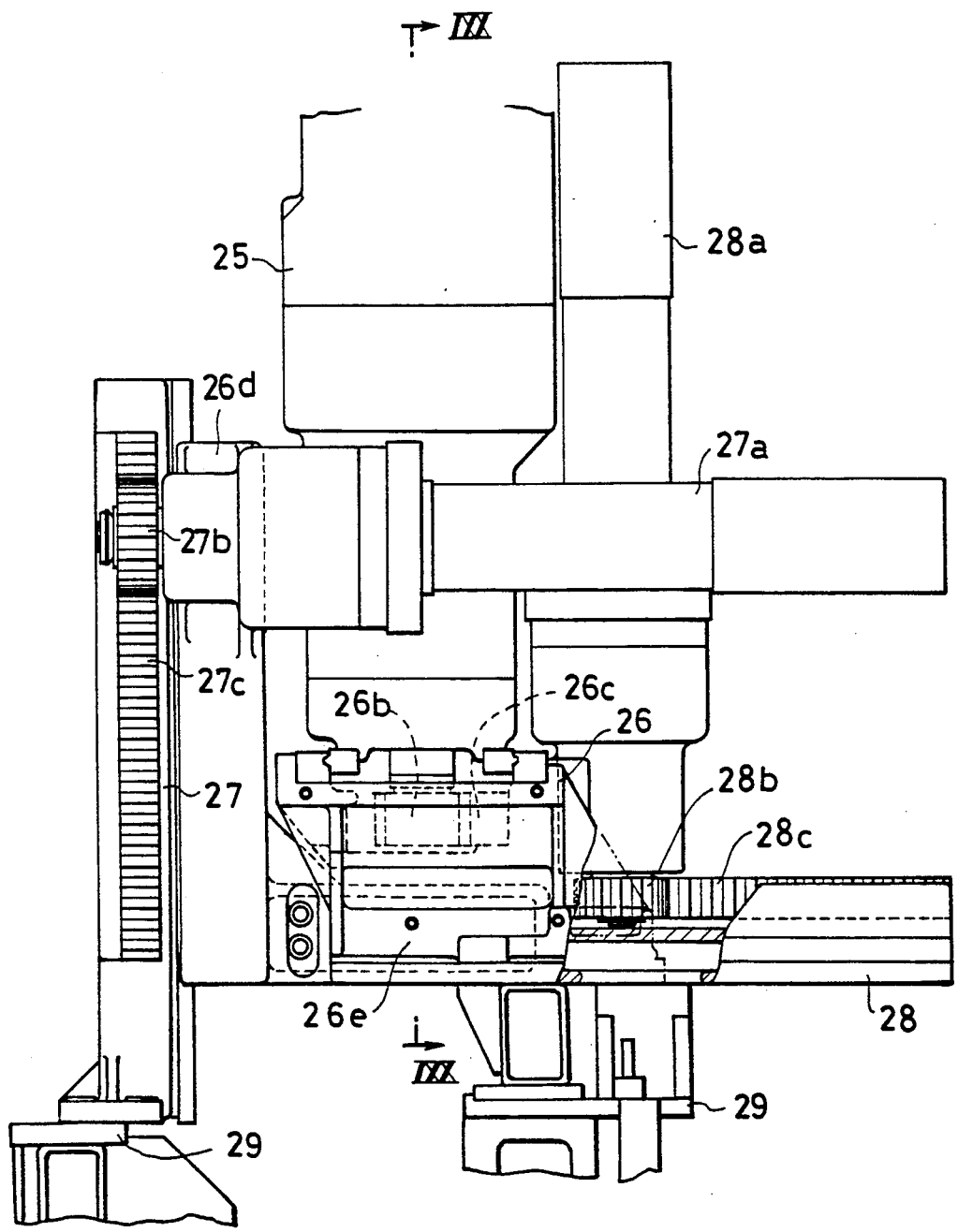
FIG. 18 is a side view as seen from the line XVIII—XVIII of FIG. 17.
Figure 19:
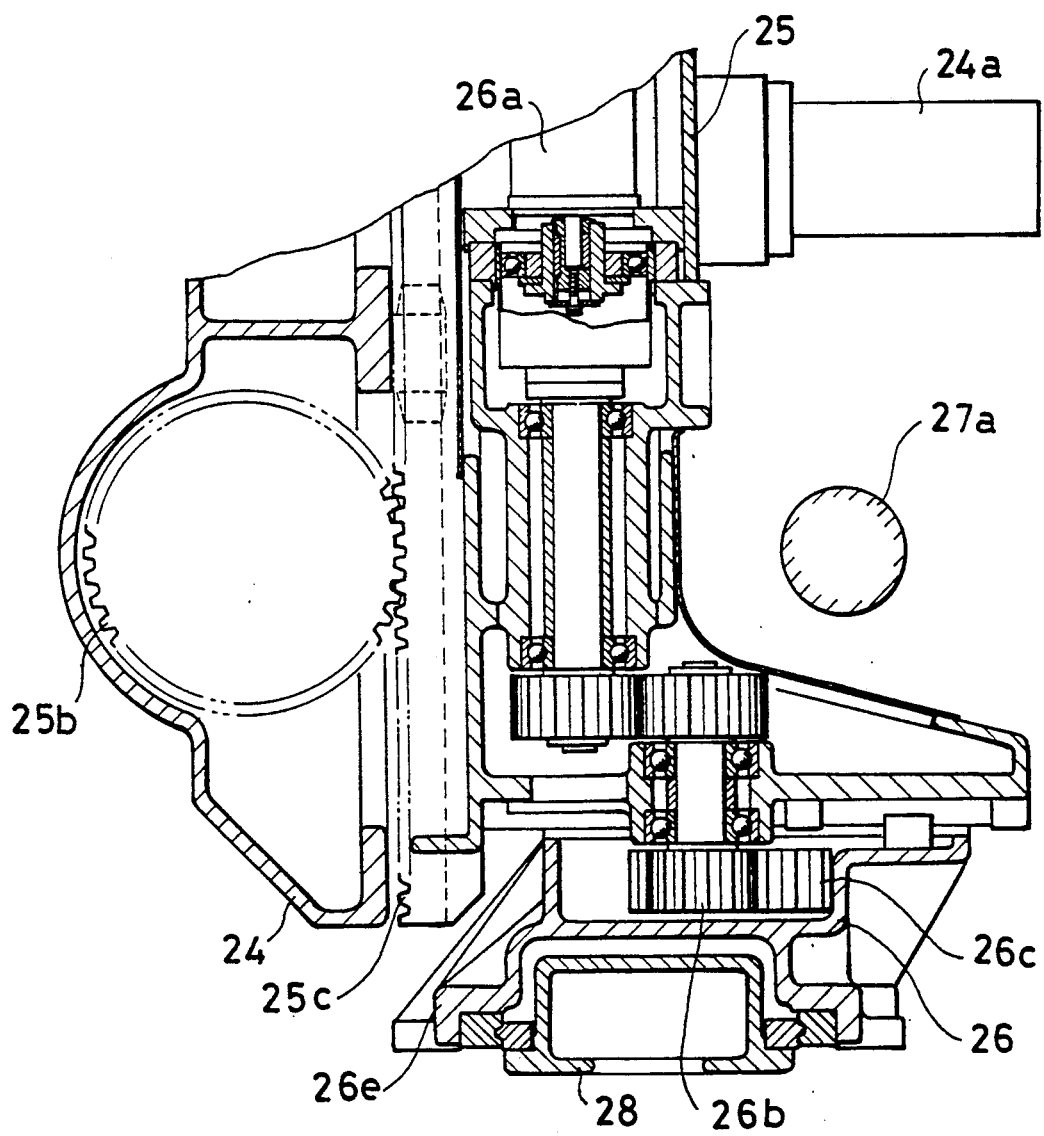
FIG. 19 is a sectional view taken along the line IXX—IXX of FIG. 18.

The dash board upper piece setting device 8 comprises as shown in FIGS. 15 and 16: a first shifting frame 24 which is supported between the guide frames $10_{c1}$, $10_{c1}$ and movable back and forth by an electric motor 24a via a pinion 24d and a rack 24c; a first lifting frame 25, as shown in FIGS. 17 through 19, which is attached to the first shifting frame 24 and which is lifted up and down by an electric motor 25a mounted on the first shifting frame 24, via a pinion 25b and a rack 25c; a slide frame 26 having a substantially L-shape in side view which is attached to the first lifting frame 25 in a suspended manner and movable in the lateral direction by an electric motor 26a which is vertically mounted inside the lifting frame 25, via a pinion 26b and a rack 26c; a second lifting frame 27 which is attached to an upwardly extending portion 26d at the rear side of the slide frame 26 and which is lifted up and down by an electric motor 27a mounted thereon, via a pinion 27b and a rack 27c; and a second shifting frame 28 which is attached to a horizontal portion 26e at the front side of the slide frame 26 and which is movable back and forth by an electric motor 28a vertically mounted thereon, via a pinion 28b and a rack 28c. A pair of front and rear holding frames 29, 29 are suspended on the second lifting frame 27 and the second shifting frame 28. A pair of right and left clampers 29a, 29a are respectively attached to both holding frames 29, 29, and a pair of right and left positioning pins 29b, 29b are attached to one of the holding frames 29.

The longitudinal distance as well as the height difference between both holding frames 29, 29 are adjusted by the movements of the second shifting frame 28 and the second lifting frame 27, according to the longitudinal width and the vertical width of the dash board upper piece $W_4$ which may vary depending on the kind and model of car being assembled. In this manner, even in case the kind or model of car is changed, the dash board upper piece $W_4$ may be securely positioned and held by both holding frames 29, 29 via the clampers 29a and the positioning pins 29b. Also, by the movement of the first shifting frame 24, the overall positioning adjustments of both holding frames 29, 29 may also be made according to the change in the set position of the dash board upper piece $W_4$.

Figure 20:
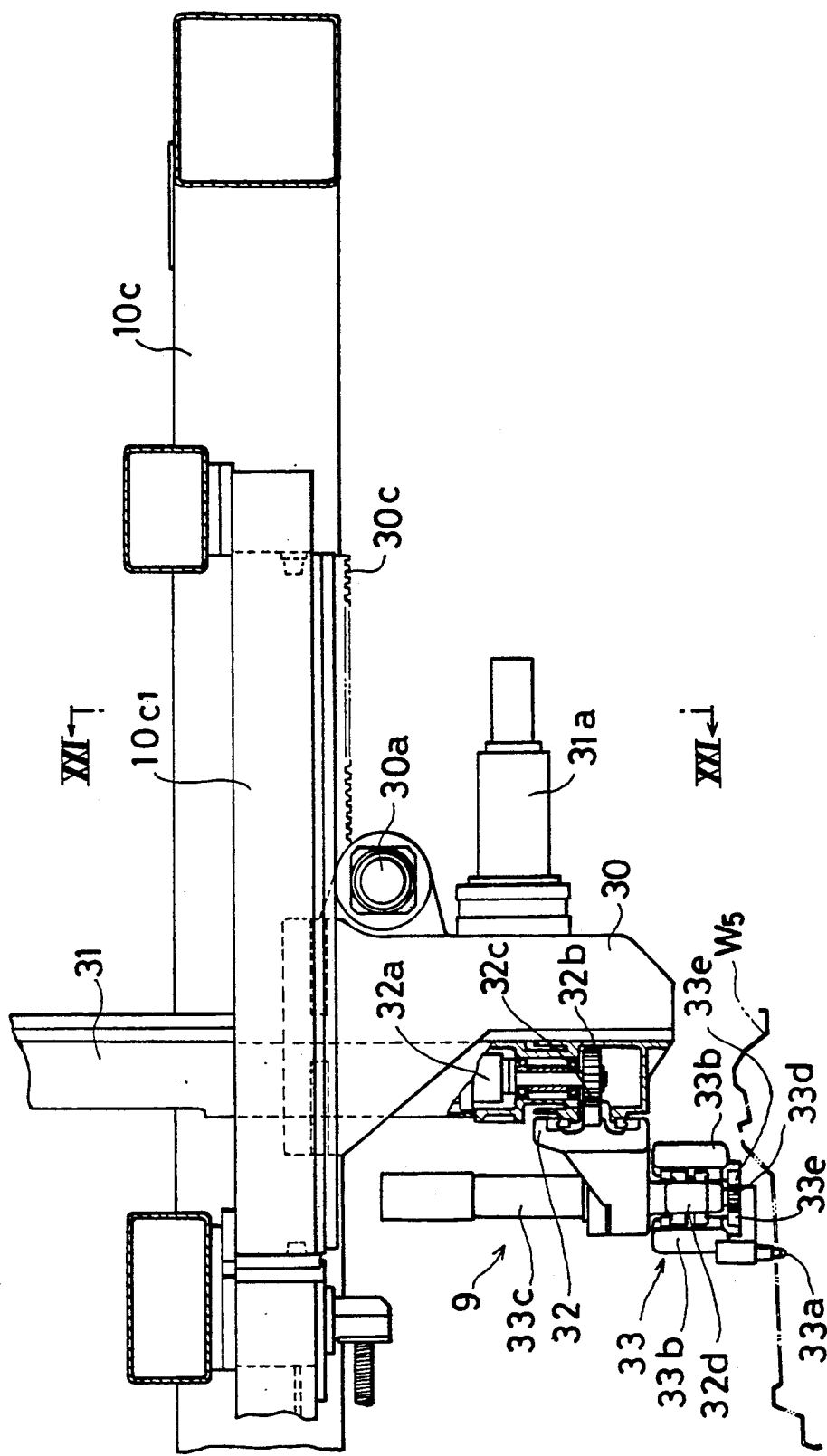
FIG. 20 is an enlarged side view of a rear tray piece setting device as seen from the line XX—XX of FIG. 1.
Figure 21:
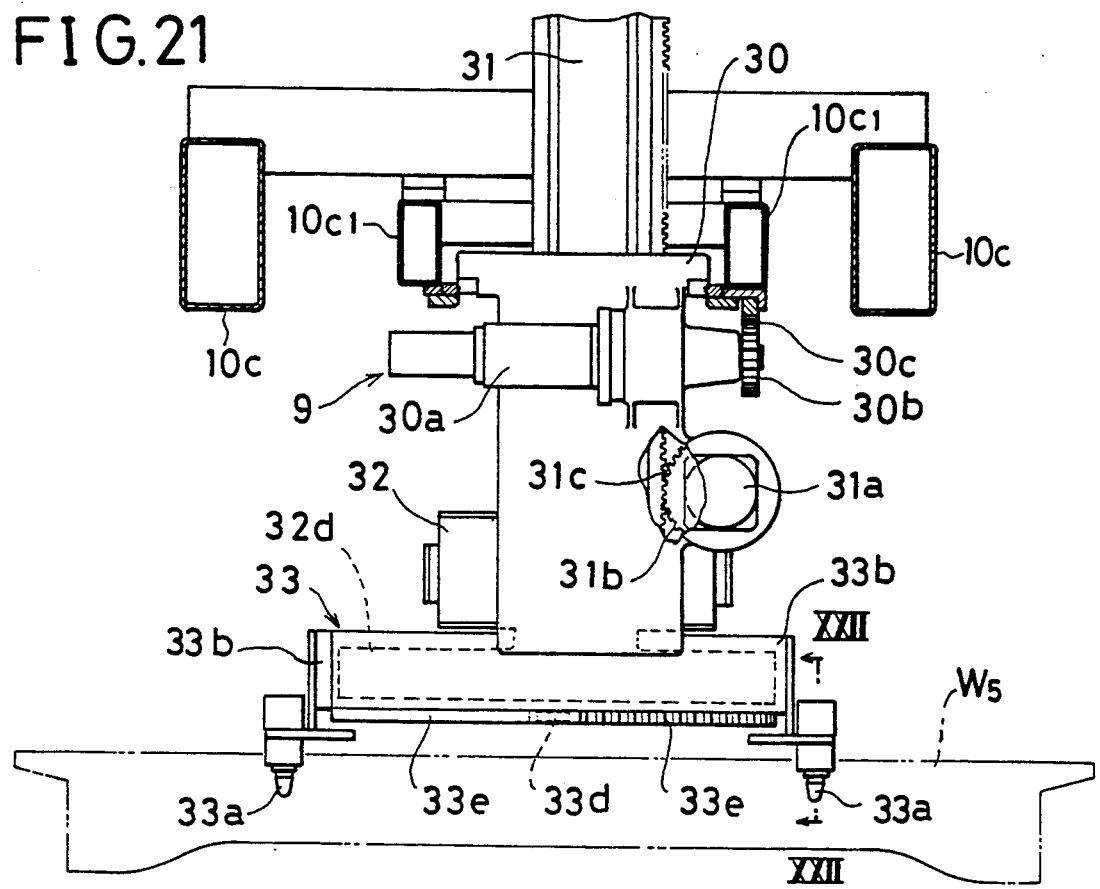
FIG. 21 is a sectional front view taken along the line XXI—XXI of FIG. 20.
Figure 22:
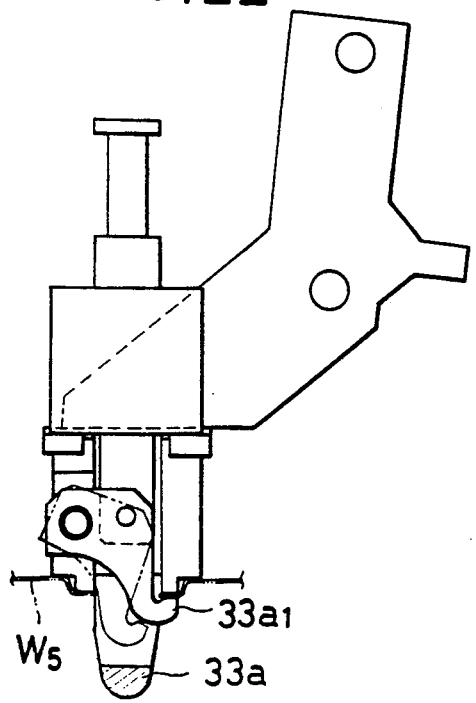
FIG. 22 is an enlarged sectional view taken along the line XXII—XXII of 21.

The rear tray piece setting device 9 comprises as shown in FIGS. 20 and 21: a shifting frame 30 which is supported between the guide frames $10_{c1}$, $10_{c1}$ so as to be movable back and forth by an electric motor 30a via a pinion 30b and a rack 30c; a lifting frame 31 which is supported by the shifting frame 30 and which is lifted up and down by an electric motor 31a mounted on the shifting frame 30, via a pinion 31b and a rack 31c; a sliding frame 32 which is attached to the lifting frame 31 and which is laterally movable by an electric motor 32a vertically mounted inside the lifting frame 31, via a pinion 32b and a rack 32c; a laterally telescopic holding frame 33 which is suspended from the sliding frame 32; and engaging pins 33a provided on each end of the holding frame 33, as shown in FIG. 22, so as to be engageable with the rear tray piece $W_5$. In this way, through the extension and contraction of the holding frame 33 as well as the movement of the shifting frame 30, the distance between, and the longitudinal position of, both engaging pins 33a, 33a are adjustable so as to be capable of coping with a change in kind and/or model of car.

The holding frame 33 comprises two front and rear plates 33b, 33b which are laterally slidably supported by a laterally elongate guide portion 32d at the bottom of the sliding frame 32. Racks 33e, 33e are fixed to the plates 33b, 33b such that the racks 33e, 33e pinch a pinion 33d, from the front and the rear thereof. The pinion 33d is connected to an electric motor 33c vertically mounted on the sliding frame 32. In this manner, through the rotation of the pinion 33d, both plates 33b, 33b are moved respectively in opposite directions so as to provide telescopic expansion and contraction of the holding frame 33.

A roof panel $W_3$, a dash board upper piece $W_4$ and a rear tray piece $W_5$ are respectively supplied to the roof panel setting device 7, the dash board upper piece setting device 8 and the rear tray piece setting device 9, by a charging device 34 which is located on one side of the set station A.

Figure 23:
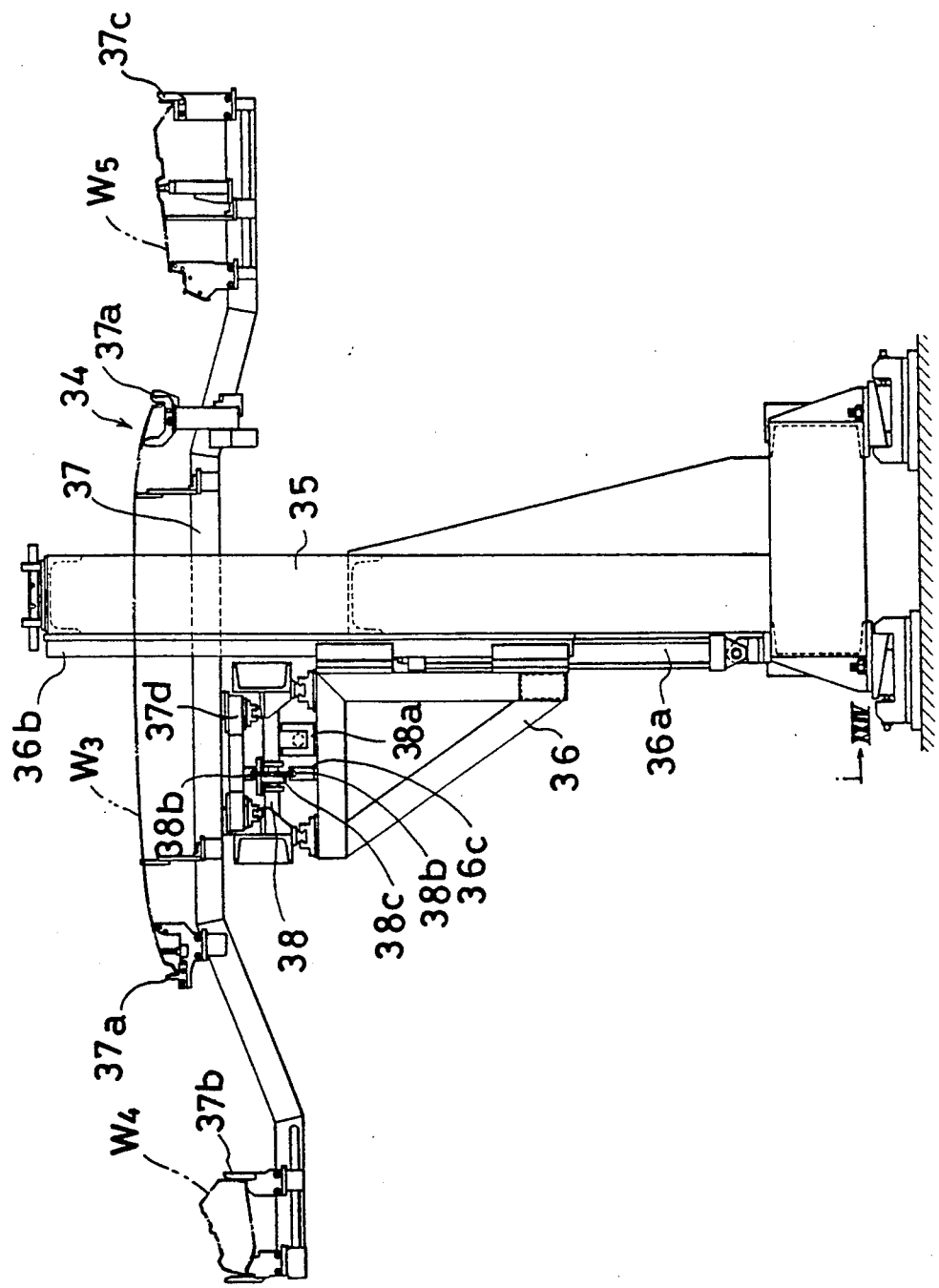
FIG. 23 is an enlarged side view of a charging device as seen from the line XIII—XXIII of FIG. 1.
Figure 24:
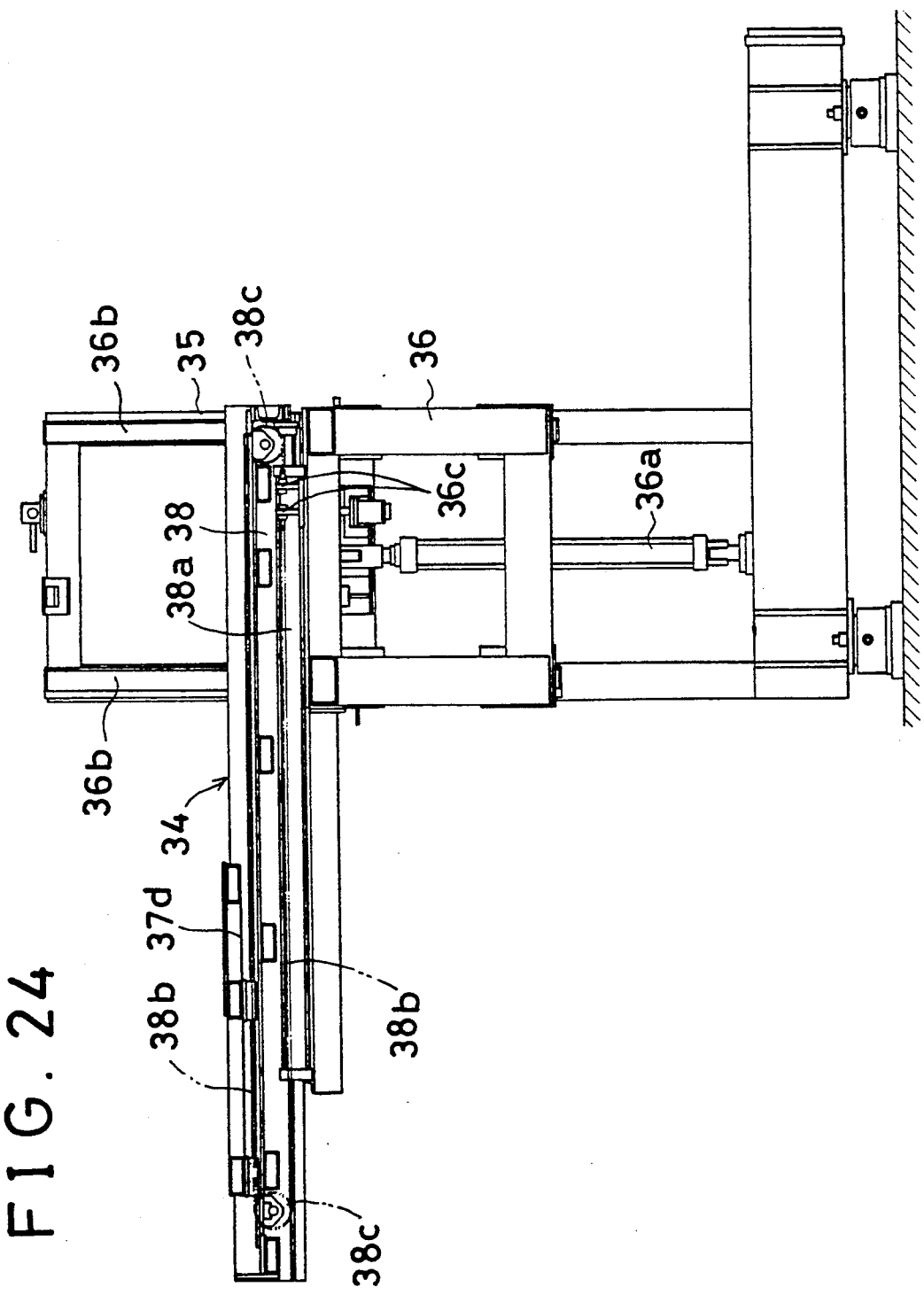
FIG. 24 is a sectional view taken along the line XXIV—XXIV of FIG. 23 with the setting frame omitted.

The charging device 34 comprises, as shown in FIGS. 23 and 24: a supporting frame 35 which is vertically disposed at a lower position of one side of the apparatus frame 10; a lifting frame 36 which is attached to the supporting frame 35 and which is lifted up and down by a cylinder 36a along guide rails 36b, 36b; and a longitudinally elongate setting frame 37 which is mounted on the lifting frame 36 and which has, at its central portion, a receiving portion 37a for the roof panel $W_3$ and, in front and at the rear thereof, receiving portions 37c, 37b respectively for the rear tray piece $W_5$ and the dash board upper piece $W_4$. The setting frame 37 is movable to advance and retreat, via a sliding frame 38, between the setting position at a side of the setting station A and the discharging position inside the setting station A. In more detail, the sliding frame 38 is supported so as to be movable by the cylinder 38a to advance and retreat in the lateral direction. A supporting frame 37d is mounted on the sliding frame 38 and supports the setting frame 37 at its central bottom portion such that the setting frame 37 is movable to advance and retreat in the lateral direction. A pair of chains 38b, 38b are provided having one end respectively fixed to a pair of fixing pieces 36c, 36c parallelly provided on the lifting frame 36. The chains 38b are wound around respective sprockets 38c which are pivotally mounted on both ends of the sliding frame 38. The other end of each chain 38b is connected to the supporting frame 37d. In this construction, as a result of the forward and backward movements of the sliding frame 38, the supporting frame 37d is subjected to advancing and retreating movements on the sliding frame 38 and the setting frame 37 can be moved back and forth between a setting position and a discharging position at a high speed.

The supporting frame 35 is provided vertically at a position half way between the setting position and the discharging position. The setting frame 37 is lifted by the lifting frame 36 to a level which is slightly higher than the upper end of the supporting frame 35 and is advanced and retracted between the setting position and the discharging position. At the setting position, the setting frame 37 is lowered so that the work of setting the roof panel and the like may be easily performed.

Next, an explanation is made about the working procedure of setting the car components onto the set carrier 1.

When the set carrier 1 has been moved forwards from the setting station A to the welding station B with the completion of the setting work, the jig 16 of each side panel setting device 6 is lifted to a lifted position. Then, the setting frame 37 onto which a roof panel $W_3$, a dashboard upper piece $W_4$ and a rear tray piece $W_5$ have been set in advance onto each receiving portion 37, 37b, 37c at the setting position, is advanced to the discharging position. These car body components are then supported by the holding frames 23, 29, 33, respectively, of the roof panel setting device 7, the dash upper piece setting device 8 and the rear tray piece setting device 9. The setting frame 37 is retracted to the setting position and, at the same time, the jigs 16 which have received side panels $W_2$ from the hanger 5 at the lifted position are lowered to the lowered position.

Thereafter, when the set carrier 1 is returned to the setting station A, the floor panel $W_1$ is transported and set into position on the set carrier 1 by the floor panel setting device. Then, after the dash board upper piece $W_4$ and the rear tray piece $W_5$ are lowered by each setting device 8, 9 to predetermined positions, the jibs 16, 16 of the right and the left side panel setting devices 6, 6 are advanced in the laterally inward direction, and the right and the left side panels $W_2$, $W_2$ are set into position on the set carrier 1 by pinching, from both sides, the floor panel $W_1$, the dash board upper piece $W_4$ and the rear tray piece $W_5$. Finally, the roof panel $W_3$ is inserted from an upper position into the space between the roof side rails $W_{2a}$, $W_{2a}$ of the right and the left side panels $W_2$, $W_2$ by means of the roof panel setting device 7, thus completing one cycle of the setting work.

In the above-mentioned embodiment, the welding station B is provided in front of the setting station A and the set carrier 1 is arranged to be movable in a reciprocating manner between both stations A, B. This invention, however, is not limited to this embodiment but can similarly be applied to an assembling line as disclosed in Japanese Published Unexamined Patent Application No. 114174/1984 (U.S. Pat. No. 4,538,044) in which an intermediate station is provided between a setting station and a welding station, and car body components are transported to the welding station by transferring from a first set carrier which is reciprocated between the setting station and the intermediate station, to a second set carrier which is reciprocated between the intermediate station and the welding station.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for use in a motorcar body assembling line for setting car body components including a floor panel, a roof panel, and side panels on a set carrier in a predetermined positional relationship in a setting station at a starting end of the assembling line, said apparatus comprising:
    a floor panel setting device for transporting a floor panel to, and setting it on, the set carrier;
    a pair of right and left side-panel setting devices for receiving a pair of right and left side panels which are transported to an upper position of the setting station by a hanger and for setting them on the set carrier; and
    a roof panel setting device for setting a roof panel between roof side rails of said right and left side panels which have been set on the set carrier,
    each of said side-panel setting devices including
    (a) a vertically movable lifting frame,
    (b) means for vertically moving said lifting frame,
    (c) a jig for positioning and holding the side panel, said jig being provided on said lifting frame so as to be advanced and retracted in a lateral direction, such that the side panel is received from the hanger by lateral advancement and retraction of said jig at a lifted position of said lifting frame and that the side panel is set on the set carrier by lateral advancement and retraction of said jig at a lowered position of said lifting frame, and
    (d) means for advancing and retracting said jig in the lateral direction,
    said roof panel setting device being disposed in a laterally central portion at an upper part of the setting station, and
    a charging device disposed on one side of the setting station, said charging device having a setting frame on which the roof panel is placed and which is movable to advance and retreat in a lateral direction facing the setting station such that the roof panel is received by said roof panel setting device via said setting frame, and means for moving said setting frame,
    wherein said jig of each of said side panel setting devices is composed of a jig frame on which positioning members and a hanging member are provided, said positioning members being for respectively positioning the side panel in the longitudinal and lateral directions, said hanging member being for hanging the side panel at its roof side rail which is located at an upper part thereof,
    wherein said lifting frame is provided with a sliding frame which is movable to laterally advance and retreat, and a means for moving said sliding frame, and
    wherein said jig frame is supported by said sliding frame so as to be laterally tiltable about a longitudinal axis and said sliding frame includes means for tilting said jig frame.

2. An apparatus for use in a motorcar body assembling line according to claim 1, further comprising a dash board upper piece setting device and a rear tray piece setting device provided respectively in front of and at the rear of said roof panel setting device in the laterally central portion at the upper part of the setting station; and wherein receiving portions for a rear tray piece and for a dash board upper piece are provided on said setting frame respectively in front of and at the rear of a receiving portion on which the roof panel is placed.

3. An apparatus for use in a motorcar body assembling line for setting car body components including a floor panel, a roof panel, and side panels on a set carrier in a predetermined positional relationship in a setting station at a starting end of the assembling line, said apparatus comprising:
    a floor panel setting device for transporting a floor panel to, and setting it on, the set carrier;

a pair of right and left side-panel setting devices for receiving a pair of right and left side panels which are transported to an upper position of the setting station by a hanger and for setting them on the set carrier; and a roof panel setting device for setting a roof panel between roof side rails of said right and left side panels which have been set on the set carrier, each of said side-panel setting devices including (a) a vertically movable lifting frame, (b) means for vertically moving said lifting frame, (c) a jig for positioning and holding the side panel, said jig being provided on said lifting frame so as to be advanced and retracted in a lateral direction, such that the side panel is received from the hanger by lateral advancement and retraction of said jig at a lifted position of said lifting frame and that the side panel is set on the set carrier by lateral advancement and retraction of said jig at a lowered position of said lifting frame, and (d) means for advancing and retracting said jig in the lateral direction, said roof panel setting device being disposed in a laterally central portion at an upper part of the setting station;

an apparatus frame provided at a side upper portion of the setting station;

vertically elongate and vertically movable lifting bars provided on said apparatus frame;

means for vertically moving said lifting bars; said lifting frames of said side-panel setting devices being supported by said lifting bars in a vertically movable manner; and a charging device disposed on one side of the setting station, said charging device having a setting frame on which the roof panel is placed and which is movable to advance and retreat in a lateral direction facing the setting station such that the roof panel is received by said roof panel setting device via said setting frame, and means for moving said setting frame, wherein said jig of each of said side-panel setting devices is composed of a jig frame on which positioning members and a hanging member are provided, said positioning members being for respectively positioning the side panel in the longitudinal and lateral directions, said hanging member being for hanging the side panel at its roof side rail which is located at an upper part thereof, wherein said lifting frame is provided with a sliding frame which is movable to laterally advance and retreat, and a means for moving said sliding frame, and wherein said jig frame is supported by said sliding frame so as to be laterally tiltable about a longitudinal axis and said sliding frame includes means for tilting said jig frame.

4. An apparatus for use in a motorcar body assembling line according to either of claims 1 or 3, wherein each said side panel setting device further includes means for moving said jig in the longitudinal direction.

5. An apparatus for use in a motorcar body assembling line for setting car body components including a floor panel, a roof panel, and side panels on a set carrier in a predetermined positional relationship in a setting station at a starting end of the assembling line, said apparatus comprising:

a floor panel setting device for transporting a floor panel to, and setting it on, the set carrier;

a pair of right and left side-panel setting devices for receiving a pair of right and left side panels which are transported to an upper position of the setting station by a hanger and for setting them on the set carrier; and a roof panel setting device for setting a roof panel between roof side rails of said right and left side panels which have been set on the set carrier, each of said side-panel setting devices including (a) a vertically movable lifting frame, (b) means for vertically moving said lifting frame, (c) a jig for positioning and holding the side panel, said jig being provided on said lifting frame so as to be advanced and retracted in a lateral direction, such that the side panel is received from the hanger by lateral advancement and retraction of said jig at a lifted position of said lifting frame and that the side panel is set on the set carrier by lateral advancement and retraction of said jig at a lowered position of said lifting frame, and (d) means for advancing and retracting said jig in the lateral direction, said roof panel setting device being disposed in a laterally central portion at an upper part of the setting station, and a charging device disposed on one side of the setting station, said charging device having a setting frame on which the roof panel is placed and which is movable to advance and retreat in a lateral direction facing the setting station such that the roof panel is received by said roof panel setting device via said setting frame, and means for moving said setting frame, wherein said jig of each of said side panel setting devices is composed of a jig frame on which positioning members and a hanging member are provided, said positioning members being for respectively positioning the side panel in the longitudinal and lateral directions, said hanging member being for hanging the side panel at its roof side rail which is located at an upper part thereof, said hanging member comprising:

a laterally elongate guide piece for slidably supporting a flange portion at the bottom of the roof side rail of the side panel;

a clamping seat for receiving a side of the flange portion, said clamping seat being provided at a base end side of said guide piece;

a clamping member having a clamping piece which clamps the flange portion between said clamping piece and said clamping seat and which is movable to open and close in the longitudinal direction of said guide piece; and means for moving said clamping piece to open and close;

wherein said lifting frame is provided with a sliding frame which is movable to laterally advance and retreat, and a means for moving said sliding frame, and wherein said jig frame is supported by said sliding frame so as to be laterally tiltable about a longitudinal axis and said sliding frame includes means for tilting said jig frame.

6. An apparatus for use in a motorcar body assembling line according to claim 5, wherein confronting faces of said clamping seat and of said clamping piece are arcuate in their vertical cross sections, and project in a confronting direction relative to each other.

* * * * *